United States Patent
Uzun et al.

(10) Patent No.: US 11,663,307 B2
(45) Date of Patent: May 30, 2023

(54) RTCAPTCHA: A REAL-TIME CAPTCHA BASED LIVENESS DETECTION SYSTEM

(71) Applicant: Georgia Tech Research Corporation, Atlanta, GA (US)

(72) Inventors: Erkam Uzun, Atlanta, GA (US); Pak Ho Chung, Atlanta, GA (US); Irfan A. Essa, Atlanta, GA (US); Wenke Lee, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 99 days.

(21) Appl. No.: 16/580,628

(22) Filed: Sep. 24, 2019

(65) Prior Publication Data

US 2020/0097643 A1 Mar. 26, 2020

Related U.S. Application Data

(60) Provisional application No. 62/735,296, filed on Sep. 24, 2018.

(51) Int. Cl.
| | |
|---|---|
| *G06F 21/00* | (2013.01) |
| *G06F 21/32* | (2013.01) |
| *G06V 40/40* | (2022.01) |

(52) U.S. Cl.
CPC .............. *G06F 21/32* (2013.01); *G06V 40/45* (2022.01); *G06F 2221/2103* (2013.01); *G06F 2221/2133* (2013.01); *G06F 2221/2141* (2013.01)

(58) Field of Classification Search
CPC ............. G06F 21/32; G06F 2221/2141; G06F 2221/2103; G06F 2221/2133; G06K 9/00906; G06K 9/0061; G06K 9/00335; G06K 9/00899; G06K 9/00288; G10L 17/22

See application file for complete search history.

(56) References Cited

U.S. PATENT DOCUMENTS

| | | | | |
|---|---|---|---|---|
| 2016/0006744 | A1* | 1/2016 | Du | H04L 67/18 726/4 |
| 2017/0124312 | A1* | 5/2017 | Inoue | H04L 63/0861 |
| 2017/0161490 | A1* | 6/2017 | Fedor | G06F 21/31 |
| 2017/0345003 | A1* | 11/2017 | Spears | H04L 63/102 |

(Continued)

OTHER PUBLICATIONS

Brodic, et al., "Response time analysis of text-based Captcha by association rules", Springer International Publishing, Switzerland 2016.

(Continued)

*Primary Examiner* — Jeffrey C Pwu
*Assistant Examiner* — William A Corum, Jr.
(74) *Attorney, Agent, or Firm* — Thomas | Horstemeyer, LLP

(57) ABSTRACT

Example systems and methods for defending against powerful, automated attacks on facial authentication systems are disclosed. A first verification is performed based at least in part on determining a response time for a response to a CAPTCHA or other challenge. In response to determining that the response time is within a threshold, a second verification is performed based at least in part on extracting a face feature or a voice feature from a plurality of samples associated with the response.

17 Claims, 12 Drawing Sheets

(56) References Cited

U.S. PATENT DOCUMENTS

2019/0018937 A1* 1/2019 Jadhav .................. G06F 21/31
2021/0173916 A1* 6/2021 Ortiz ..................... G10L 15/02

OTHER PUBLICATIONS

Peng, et al., "Discriminating natural images and computer generated graphics based on the impact of CFA interpolation on the correlation of PRNU", ScienceDirect, Digital Investigation 11 (2014).

Caldelli, et al., "An analysis on attacker actions in fingerprint-copy attack in source camera identification", WIFS '2011, Nov. 16-19, IEEE.

Peng, et al., Discrimination of natural images and computer generated graphics based on multi-fractal and regression analysis, Int. J. Electron. Commun, ScienceDirect, 2017.

Kim, et al., "Face Liveness detection using variable focusing", IEEE, 2013.

Li, et al., "Understanding OSN-based facial disclosure against face authentication systems", Jun. 4-6, 2014. ASIA.

Blanz, et al., "A morphable model for the synthesis of 3D faces", Proceedings of the 26th annual conference on Computer graphics and interactive techniques, Jul. 199.

Manjani, et al., "Detecting silicone mask-based presentation attack via deep dictionary learning", IEEE transactions on Information forensics and security, vol. 12, No. 7, Jul. 2017.

Marcus Niemietz, "UI Redressing Attacks on Android Devices Revisited", Black hat ASIA 2014.

Taigman, Yaniv, et al. "Deepface: Closing the gap to human-level performance in face verification." Proceedings of the IEEE conference on computer vision and pattern recognition. Jun. 2014.

Schroff, Florian; et al. "Facenet: A unified embedding for face recognition and clustering." Proceedings of the IEEE conference on computer vision and pattern recognition. Jun. 2015.

Uber. (Sep. 2016) Selfies and Security, real-time id check. https://newsroom.uber.com/securityselfies/.

Alipuy. (Mar. 2015) Alibaba uses facial recognition tech for online payments. https://www.computerworld.com/article/2897117/alibaba-uses-facial-recognition-tech-for-online-payments.html.

MasterCard. (Feb. 2016) MasterCard unveils 'selfie' security checks. https://www.theverge.com/2016/2/23/11098540/mastercard-facial-recognition-heartbeat-security.

Duc, Nguyen Minh; et al. "Your face is not your password face authentication bypassing lenovo-asus-toshiba." Black Hat Briefings 4 (Dec. 2009): 158.

Nesli, Erdogmus; et al. "Spoofing in 2d face recognition with 3d masks and anti-spoofing with kinect." IEEE 6th International Conference on Biometrics: Theory, Applications and Systems (BTAS'13). Sep. 2013.

Liu, Siqi, et al. "A 3D mask face anti-spoofing database with real world variations." Proceedings of the IEEE conference on computer vision and pattern recognition workshops. Jun. 2016.

Bai, Jiamin, et al. "Is physics-based liveness detection truly possible with a single image?" Proceedings of 2010 IEEE International Symposium on Circuits and Systems. IEEE, May 2010.

Tan, Xiaoyang, et al. "Face liveness detection from a single image with sparse low rank bilinear discriminative model." European Conference on Computer Vision. Springer, Berlin, Heidelberg, Sep. 2010.

Maatta, Jukka; et al. "Face spoofing detection from single images using micro-texture analysis." 2011 international joint conference on Biometrics (IJCB). IEEE, Oct. 2011.

Da Silva Pinto, Allan, et al. "Video-based face spoofing detection through visual rhythm analysis." 2012 25th SIBGRAPI Conference on Graphics, Patterns and Images. IEEE, Aug. 2012.

Boulkenafet, Zinelabidine; et al. "Face spoofing detection using colour texture analysis." IEEE Transactions on Information Forensics and Security 11.8 (Aug. 2016): 1818-1830.

Kose, Neslihan; et al. "Reflectance analysis based countermeasure technique to detect face mask attacks." 2013 18th International Conference on Digital Signal Processing (DSP). IEEE, Jul. 2013.

Kobayashi, Michihiro; et al. "Detecting forgery from static-scene video based on inconsistency in noise level functions." IEEE Transactions on Information Forensics and Security 5.4 (Dec. 2010): 883-892.

Rao, Yuan; et al. "A deep learning approach to detection of splicing and copy-move forgeries in images." 2016 IEEE International Workshop on Information Forensics and Security (WIFS). IEEE, Dec. 2016.

Chetty, Girija; et al. "Multi-level liveness verification for face-voice biometric authentication." 2006 Biometrics Symposium: Special Session on Research at the Biometric Consortium Conference. IEEE, Sep. 2006.

Pan, Gang, et al. "Eyeblink-based anti-spoofing in face recognition from a generic webcamera." 2007 IEEE 11th International conference on computer vision. IEEE, Oct. 2007.

Wu, Zhizheng; et al. "Investigating gated recurrent networks for speech synthesis." 2016 IEEE International Conference on Acoustics, Speech and Signal Processing (ICASSP). IEEE, Mar. 2016.

Xu, Yi, et al. "Virtual u: Defeating face liveness detection by building virtual models from your public photos." 25th {USENIX} Security Symposium ({USENIX} Security 16). Aug. 2016.

Paysan, Pascal, et al. "A 3D face model for pose and illumination invariant face recognition." 2009 sixth IEEE International conference on advanced video and signal based surveillance. IEEE. Sep. 2009.

Suwajanakorn, Supasorn; et al. "What makes tom hanks look like tom hanks." Proceedings of the IEEE international conference on computer vision. Dec. 2015.

Saito, Shunsuke, et al. "Photorealistic facial texture inference using deep neural networks." Proceedings of the IEEE Conference on Computer Vision and Pattern Recognition. Jul. 2017.

Li, Yan, et al. "Seeing your face is not enough: An inertial sensor-based liveness detection for face authentication." Proceedings of the 22nd ACM SIGSAC Conference on Computer and Communications Security. Oct. 2015.

Li, Kai, et al. "A data-driven approach for facial expression synthesis in video." 2012 IEEE Conference on Computer Vision and Pattern Recognition. IEEE, Jun. 2012.

Thies, Justus, et al. "Face2face: Real-time face capture and reenactment of rgb videos." Proceedings of the IEEE conference on computer vision and pattern recognition. Jun. 2016.

Chakka, Murali Mohan, et al. "Competition on counter measures to 2-d facial spoofing attacks." 2011 International Joint Conference on Biometrics (IJCB). IEEE, Oct. 2011.

Chingovska, Ivana, et al. "The 2nd competition on counter measures to 2D face spoofing attacks." 2013 International Conference on Biometrics (ICB). IEEE, May 2013.

I. J. C. on Biometrics. (Oct. 2017) Competition on generalized face presentation attack detection in mobile authentication scenarios https://sites.google.com/site/faceantispoofing/.

Booth, James, et al. "A 3d morphable model learnt from 10,000 faces." Proceedings of the IEEE Conference on Computer Vision and Pattern Recognition. Jun. 2016.

Huber, Patrik, et al. "A multiresolution 3d morphable face model and fitting framework." Proceedings of the 11th joint conference on computer vision, imaging and computer graphics theory and applications. SciTePress, Feb. 2016.

Gao, Haichang, et al. "An audio CAPTCHA to distinguish humans from computers." 2010 Third International Symposium on Electronic Commerce and Security. IEEE, Jan. 2010.

Wu, Zhizheng, et al. "A study of speaker adaptation for DNN-based speech synthesis." Sixteenth Annual Conference of the International Speech Communication Association. Sep. 2015.

Shirali-Shahreza, Sajad; et al. "Verifying human users in speech-based interactions." Twelfth Annual Conference of the International Speech Communication Association. Aug. 2011.

Zhang, Zhiwei, et al. "A face antispoofing database with diverse attacks." 2012 5th IAPR international conference on Biometrics (ICB). IEEE, Mar. 2012.

(56) References Cited

OTHER PUBLICATIONS

Wu, Zhizheng, et al. "ASVspoof 2015: the first automatic speaker verification spoofing and countermeasures challenge." Sixteenth annual conference of the international speech communication association. Sep. 2015.
Gao, H; et al. "A simple generic attack on text captchas." Conference: Network and Distributed System Security Symposium (Jan. 2016).
Huggins-Daines, David, et al. "Pocketsphinx: A free, real-time continuous speech recognition system for hand-held devices." 2006 IEEE International Conference on Acoustics Speech and Signal Processing Proceedings. vol. 1. IEEE, May 2006.
Amodei, Dario, et al. "Deep speech 2: End-to-end speech recognition in english and mandarin." International conference on machine learning. PMLR, Dec. 2015.
Mousazadeh, Saman; et al. "Voice activity detection in presence of transient noise using spectral clustering." IEEE Transactions on Audio, Speech, and Language Processing 21.6 (Feb. 2013): 1261-1271.
Uzun, Erkam, and Husrev T. Sencar. "A preliminary examination technique for audio evidence to distinguish speech from non-speech using objective speech quality measures." Speech Communication 61 (Mar. 2014): 1-16.
Van Segbroeck; et al. "A robust frontend for VAD: exploiting contextual, discriminative and spectral cues of human voice." INTERSPEECH. Aug. 2013.
Bursztein, Elie, et al. "The end is nigh: Generic solving of text-based CAPTCHAs." 8th {USENIX} Workshop on Offensive Technologies ({WOOT} 14). Aug. 2014.
Fratantonio, Yanick, et al. "Cloak and dagger: from two permissions to complete control of the UI feedback loop." 2017 IEEE Symposium on Security and Privacy (SP). IEEE, May 2017.
Assael, Yannis M., et al. "Lipnet: Sentence-level lipreading." arXiv preprint arXiv:1611.01599 2.4 (Nov. 2016).

\* cited by examiner

| Sample | Scheme | Websites |
|---|---|---|
| Noah ebyspan | reCAPTCHA (CCT scheme) | linkedin, facebook google,youtube,twitter blogspot, wordpress... |
| 19761 | Ebay (CCT scheme) | ebay.com |
| dbgxyHNci | Yandex (Hollow scheme) | yandex.com |
| dbgxyHvz6 | Yahoo! (Hollow scheme) | yahoo.com |
| AMCAE | Amazon (CCT scheme) | amazon.com |
| 83Kf-1CNRw | Microsoft (CI scheme) | live.com bing.com |

| Task # | Captcha Scheme | Time (secs) | | | | Recognition Accuracy (%) | | | |
|---|---|---|---|---|---|---|---|---|---|
| | | Human$_{aud}$ | Attack$_{typ}$ | Attack$_{ocr}$ | Attack$_{sext}$ | Human$_{aud}$ | Attack$_{typ}$ | Attack$_{ocr}$ | Attack$_{sext}$ |
| 1 | Plaintext | 0.77 | N/A | N/A | N/A | 91.9 | N/A | N/A | N/A |
| 2 | reCaptcha$_{num}$ | 0.90 | 22.11 | 2.98 | 10.27 | 87.1 | 96.7 | 0 | 77.2 |
| 2 | Ebay$_{num}$ | 0.73 | 12.33 | 2.79 | 05.98 | 94.1 | 100 | 0 | 58.8 |
| 2 | Yandex$_{num}$ | 0.89 | 15.03 | 3.30 | 15.50 | 87.7 | 96.7 | 0 | 62.2 |
| 3 | reCaptcha$_{plain}$ | 1.02 | 20.88 | 3.03 | N/A | 88.0 | 91.3 | 0 | N/A |

FIG. 12

| Trial # | Task-1 | Task-2 | Task-3 | Task-4 | Task-5 |
|---|---|---|---|---|---|
| 1 | 90.3 | 87.1 | 90.3 | 80.7 | 90.3 |
| 2/3 | 100 | 100 | 96.8 | 100 | 100 |

| Scheme | Cao et al. [46] | | Burszstein et al. [53] | |
|---|---|---|---|---|
| | Acc(%) | Time(s) | Acc(%) | Time(s) |
| rCAPTCHA(Old) | 7.8 | 8.06 | 21.74 | 7.16 |
| rCAPTCHA | 77.2 | 10.27 | 19.22 | 4.59 |
| Yahoo! | 5 | 28.56 | 3.67 | 7.95 |
| Baidu | 44.2 | 2.81 | 54.38 | 1.9 |
| Wikipedia | 23.8 | 3.74 | 28.29 | N/A |
| QQ | 56 | 4.95 | N/A | N/A |
| Microsoft | 16.2 | 12.59 | N/A | N/A |
| Amazon | 25.8 | 13.18 | N/A | N/A |
| Taobao | 23.4 | 4.64 | N/A | N/A |
| Sina | 9.4 | 4.83 | N/A | N/A |
| eBay | 58.8 | 5.98 | 42.92 | 2.31 |
| Yandex | 3.2 | 15.3 | N/A | N/A |

FIG. 13

| Service | Acc(%) | Time(s) | Service | Acc(%) | Time(s) |
|---|---|---|---|---|---|
| anti-captcha | 99.0 | 7 | 2captcha | 96.6 | 10 |
| captchaboss | 99.9 | 8 | imagetyperz | 99.0 | 12 |
| deathbycaptcha | 95.8 | 10 | 9kw.eu | N/A | 30 |

FIG. 14

RTCAPTCHA: A REAL-TIME CAPTCHA BASED LIVENESS DETECTION SYSTEM

CROSS-REFERENCE TO RELATED APPLICATIONS

This application claims the benefit of and priority to U.S. Provisional Patent Application No. 62/735,296 entitled "rtCaptcha: A Real-Time Captcha Based Liveness Detection System" filed on Sep. 24, 2018, which is expressly incorporated by reference as if fully set forth herein in its entirety.

NOTICE OF GOVERNMENT-SPONSORED RESEARCH

Government sponsorship notice: This invention was made with government support under Award No. W911NF-16-1-0485 awarded by the U.S. Army Research Office. The government has certain rights in the invention.

BACKGROUND

As facial and voice recognition capabilities for mobile devices become less costly and more ubiquitous, it is common for companies to incorporate these capabilities into user authentication systems. These capabilities can allow, for example, a user to authenticate by showing his or her face to a camera, or by talking into a microphone, in lieu of entering a password. To be successful, user authentication systems should be able to tell the difference between a genuine user and an imposter or unauthorized entity. Approaches such as requesting a user to smile or blink provide only some defense against the likelihood that an unauthorized entity can compromise a user authentication system by impersonating a genuine user. Conventional face- and voice-based authentication systems are also vulnerable to powerful and automated attacks.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 8 is a table summarizing CAPTCHA schemes that can be used by a system according to various examples of the present disclosure.

FIG. 11 is a chart of response times and recognition accuracy of a system according to various examples of the present disclosure.

FIG. 12 is a table of retry measurements of a system according to various examples of the present disclosure.

FIG. 13 is a table of decoding accuracy and solving times for attacks according to various examples of the present disclosure.

FIG. 14 is a table of decoding accuracy and solving times for generic attacks according to various examples of the present disclosure.

DETAILED DESCRIPTION

Figure 1:
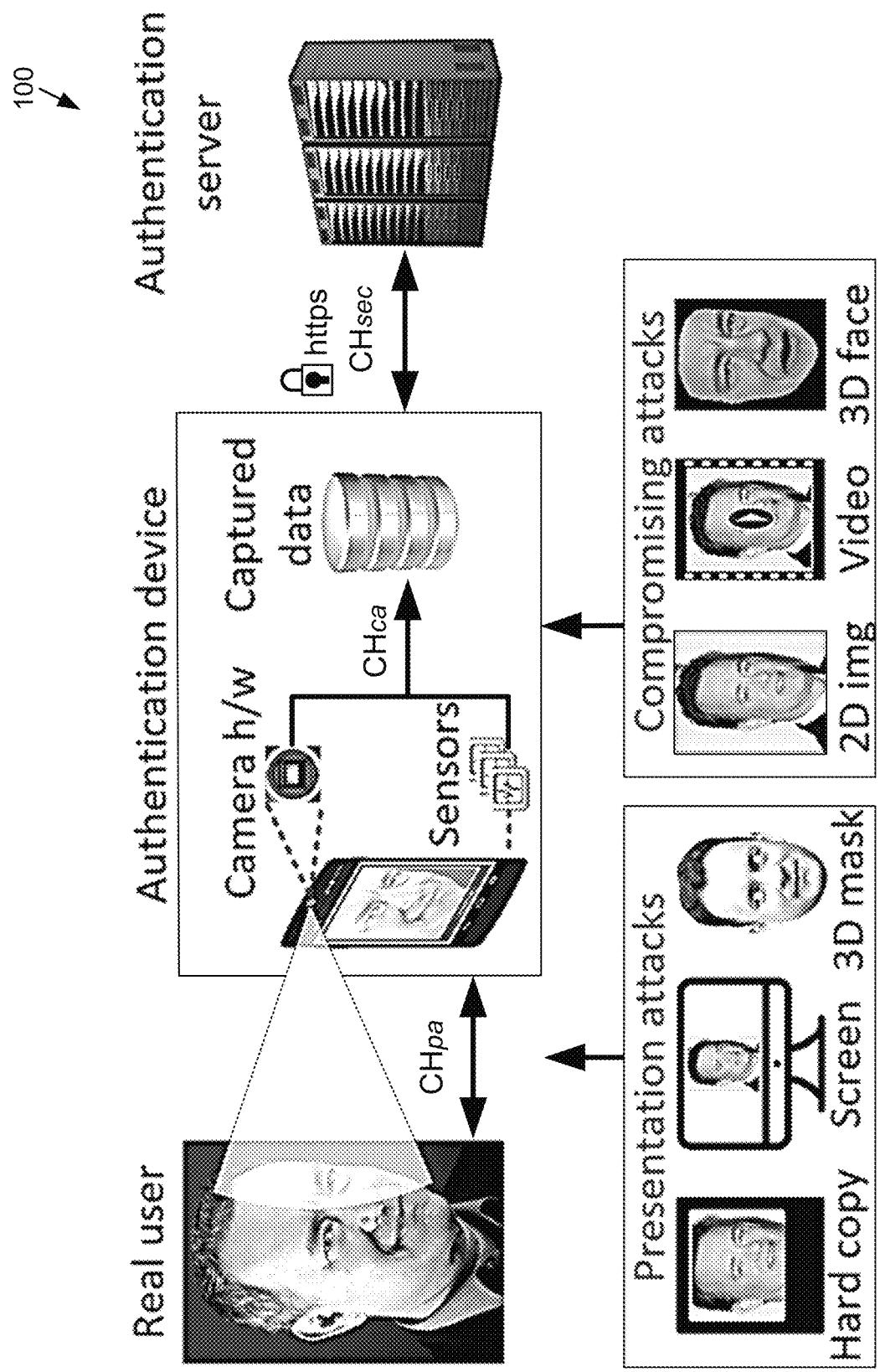
FIG. 1 is an example of attack channels and possible spoofing media types according to various examples of the present disclosure.

The availability of highly accurate facial and voice recognition capability through free cloud based services (e.g. Microsoft Cognitive Services or Amazon Rekognition), as well as the availability of mobile phones with cameras and microphone encourage companies to incorporate these forms of easily accessible biometrics into their user authentication systems. In particular, some services (e.g. Mastercard Identity Check) allow users to authenticate themselves by showing their face in front of their phone's camera, or talking to the phone. Unfortunately, deep learning based techniques can be used to forge a person's voice and face, and such techniques can be used to defeat many face- or voice-based authentication systems. Liveness detection is supposed to pose some challenges to using forged faces/voices to impersonate a victim, but existing liveness detection are no match for their deep learning based adversary.

Empirical analysis shows that most popular cloud based audio/visual authentication systems are vulnerable to even the most primitive impersonation attacks. In this disclosure, a Real Time Captcha (rtCaptcha) is introduced that is a practical approach to place a formidable computation burden to adversaries by leveraging the proven security infrastructure of one or more challenges that can include a Completely Automated Public Turing test to tell Computers and Humans Apart (CAPTCHA). In particular, rtCaptcha can authenticate a user by taking a video or audio recording of the user solving a presented CAPTCHA and use it as a form of liveness detection. Thanks in part to the security of CAPTCHAs, e.g., the time it takes to automatically solving them is still significantly slower than solving them manually, rtCaptcha is able to provide additional features that can keep a human adversary (e.g., someone who wants to impersonate a victim) in the loop, and thus rtCaptcha can prevent the adversary from scaling up his/her attack. This is true even if the adversary can harvest the faces and voices of many users to build a facial/voice model for each of them, and is a sharp contrast to simpler liveness detection like asking the user to blink, smile, or nod their heads. Further, the human response times to the most popular CAPTCHA schemes can be measured. In some examples, adversaries have to solve CAPTCHA in less than 2 seconds to appear live/human, which is not probably even for the best attacks.

Recent advances in deep learning have made it possible to have automatic facial recognition/verification systems that achieve human-level performance even under the challenges of unconstrained conditions such as changing illumination, pose and facial expressions of the subject, occlusion and aging variability. In particular, researchers from Facebook and Google have respectively achieved recognition accuracies of 97.35% and 99.63% on faces from the wild. These advancements have opened up the market of facial recognition as a service, which in turns lead to the increasing popularity of face-based authentication systems. For instance, major companies like Uber, Alipay and Mastercard have adopted selfie payment methods which allow users to blink or smile at their phone's camera to pay. Unfortunately, with new means of authentication comes new attacks. In particular, despite the high accuracy in facial recognition under benign conditions, it has been found that these new face-based authentication systems can be very weak against impersonation attacks, even if they are already designed with some liveness detection to defeat attacks that simple capture and replay the victim's face. To improve current systems' resilience against impersonation attacks, the present disclosure proposes a practical defense mechanism which leverages the proven security infrastructure of CAPTCHAs to limit the scalability of attacks on face authentication systems.

Turning to the drawings, FIG. 1 illustrates an example 100 of attack channels (e.g., specified by ISO/IEC 30107 standard) and possible spoofing media types deployed via these channels. Generally, attacks against face-based authentication systems can be categorized into presentation attacks ($CH_{pa}$) and compromising attacks ($CH_{ca}$), as depicted in FIG. 1. Presentation attacks work by presenting an appropriate spoofing media (e.g., a single photo, a video or a wearable 3D mask) to a genuine camera or microphone. Such attacks can require the attacker to be physically in front of the client device, and thus do not scale very well.

Compromising attacks can overcome the physical-presence limitation by compromising and manipulating (if not directly fabricating) a digital representation of what is captured by a physical sensor (e.g., associated with a camera or a microphone). As indicated in FIG. 1, such compromise can happen anywhere in the processing of the captured buffer. Even if it is assumed that an attacker cannot compromise a secure channel (depicted as $CH_{sec}$ in FIG. 1) or the authentication server (FIG. 1) which analyzes the video captured for authentication purpose, this still leaves a significant amount of processing on the client device open to attack. In cases like Uber, Alipay and Mastercard, this means compromising attacks can happen through a compromised kernel (e.g., rooted phone) or compromised/repackaged client apps. For the latter case, one may argue that the attacker will need to reverse engineer the client app, but relying on that to hinder attacks is essentially security by obscurity. Since it is entirely possible to remotely launch compromising attacks over many client devices (especially considering features of cellular phones and other mobile devices), it is believed that compromising attacks are a much greater threat and thus focus on such threat in this disclosure.

In terms of defense, many proposals for detecting presentation attacks focus on analyzing the received sensor data to pick up special features from the mostly planar surface used to present the spoofed face such as visual rhythm, texture and reflections. However, some of the research defending against presentation attacks involve approaches that generally do not work against compromising attacks, since the attackers can directly feed the system with very authentic looking digital images which do not have the tell-tale sign of a planar, inorganic spoofing medium in front of the camera.

Defenses against compromising attacks can be divided into several categories. The first is analyzing the authentication media by using signal processing or forensic techniques to detect forged audio/video. However, these techniques are mostly designed for older attacks where "foreign" media is injected into an authentic media to introduce some discrepancies in the signals (e.g. a person from a different photo is added into the photo being authenticated). Furthermore, since it can be assumed that the attacker has complete control over the video/audio being authenticated, he/she certain can massage it to give out the right signals these systems are looking for.

Another possible defense against compromising attacks is liveness detection, which usually works as a kind of challenge response. Examples of defenses in this category include what Uber, Alipay and Mastercard have deployed for securing their face-based authentication systems. The idea behind this line of defense is to challenge the authenticating user to perform some tasks in front of the camera (e.g., smile or blink), and the security of this approach is based on the assumption that the attacker cannot manipulate the video they are feeding the system in real time to make it look like the user in the generated video is performing the required task at the right timing. However, such assumption is more and more challenged by advances in generating facial/voice model of a real user which can be manipulated to perform some simple "tasks". For instance, as shown by Z. Wu and S. King, "Investigating gated recurrent networks for speech synthesis," in Acoustics, Speech and Signal Processing (ICASSP), 2016 IEEE International Conference on. IEEE, 2016, pp. 5140-5144, it only takes seconds to generate a counterfeit audio sample which is indistinguishable from real samples by normal human auditory system. As another example, Y. Xu, T. Price, J.-M. Frahm, and F. Monrose, "Virtual u: Defeating face liveness detection by building virtual models from your public photos," in 25th USENIX Security Symposium (USENIX Security 16). USENIX Association, 2016, pp. 497-512, created a 3D facial model from a couple of publicly available images of the victim, and, transferred it to a VR environment to respond to the liveness detection challenge, and successfully used this method to bypass True Key from Intel Security. Such creation of 3D facial model from the victim's images is particularly suitable in the case where the client device is a compromised phone, since the attack can also use the phone to collect the victim's image. Once enough images have been collected, the creation of the model and using it to render a video of the victim performing the required task can be automated. Thus, it is believed that compromising attacks using 3D facial model creation are highly scalable.

Yet another possible defense against compromising attack is to guarantee the integrity of the received sensor output by exploiting extra hardware sensor information or through system attestation. However, such a defense may not defeat the most powerful compromising attacks, since if the attacker can compromise the output buffer of the camera, he/she most likely can compromise the output of any other sensors used. Defense based on software attestation of the system's integrity faces a similar problem; at least in theory, against an attacker that can compromise the kernel.

Accordingly, the present disclosure proposes rtCaptcha as a solution to the problem of providing a robust defense against potentially large scale compromising attacks. rtCaptcha can take the approach of performing challenge-response-based liveness detection. When compared to having the user perform tasks like blinking or smiling, one potential challenge is to have them solve a CAPTCHA and read out the answer. One significant observation behind the disclosed approach is that in order to be successful in launching an automated attack, the attacker first needs to understand what is the "task" involved in the challenge, and then instruct their 3D model to generate a video of the fake user performing the task. Making the challenge in the disclosed liveness detection scheme a CAPTCHA can basically defeat the attacker in the first step using a well-established security measure for the task. In other words, the security of rtCaptcha is built on top of a fundamental property of a CAPTCHA or another challenge that cannot be solved by a machine (e.g., a human is needed), or that otherwise poses a significant computational burden (or other burden) to the solving of the challenge by a machine. As such, rtCaptcha can prevent compromising attacks from scaling by mandating a human involved in an attack. To have some concrete idea on the strength of the disclosed scheme, the experiments have shown that normal human response time is less than 1 second even for the most complex scheme. For example, experiments have shown existing CAPTCHA solving services and modern techniques which has 34.38% max average recognizing accuracy and 6.22 secs. min. average execution time. In other words, there is a very large safety margin between the response time of a human solving a CAPTCHA and a machine trying to break one.

The present disclosure provides an empirical spoofing analysis on current cloud based audio/visual recognition and verification systems that use modern data-driven deep learning architectures. The present disclosure proposes a practical and usable liveness detection scheme by using security infrastructure of CAPTCHAs to defeat even the most scalable and automated attacks. The present disclosure performs analysis on existing automated and man powered CAPTCHA breaking services and modern CAPTCHA solving algorithms by using most popular CAPTCHA schemes in the market. Evaluations show that audio response of a normal human being to a CAPTCHA challenge is much shorter than automated attacks which have modern synthesizers and CAPTCHA breaking methods.

Threat Model

This disclosure provides systems and methods for defending against powerful, automated compromising attacks. For some examples, the following threat model can be assumed: the client device is a mobile phone with an input system (e.g., a camera and a microphone); the kernel of the client device can be compromised; the protocol between the client app running on the client device and the server can be discovered by the attacker, thus the attacker can run malicious version of the client app on the client device, and thus completely control the input system and input to the authentication server; the attacker can abuse the input system on the client device to collect samples of the face and the voice of the victim; the collected samples can then be used to generate models of the victim's voice and face, which can then be used to synthesize videos and audios for impersonating the victims during a future authentication session; and the attack can be completely automated and happen on the victim's client device.

The requirement of liveness detection systems against face spoofing attacks was first emerged by researchers who showed that existing face authentication applications for both desktop and mobile platforms are vulnerable to single image spoofing. As a defense mechanism against this attack, researchers proposed challenge-response based liveness detection mechanisms that involve user interaction such as smile, blink, lip and head movement etc. However, frame switching or video based attacks proved how easy to bypass smile or blink detection since they have arbitrary facial frames creating a motion to fulfill desired challenges. These attacks are deployed as presentation attacks, but, they are also suitable for compromising attacks. However, the latter attacks and corresponding defense mechanisms have been sophisticated for either presentation or compromising attacks.

Against presentation attacks, researchers mainly focused on discriminating 3D structure, texture or reflectance of a human face from a planar surface. To this end, 3D shape inferring features such as optical flow and focal length analysis, color and micro texture analysis or features extracting reflectance details such as visual rhythm analysis have been proposed against presentation attacks. On the other hand, researchers proposed a wearable 3D mask based presentation attack to defeat all of these anti-spoofing methods. However, reflectance and texture analysis based defense mechanisms have also been proposed against 3D mask attacks. It is worth to note that many different approaches and design choices have been proposed at the competitions on the countermeasures to presentation attacks.

Aforementioned VR based attack involving a 3D face model creation from a couple of images is more suitable for compromising attacks. Moreover, a victim's face/voice could be captured through a user interface (UI) redressing attack caused by a malicious app giving some particular permissions (e.g. draw-on-top on Android device) without his/her notice. To generate a 3D face model from these captured image/video, one highly suitable approach described in the literature is using pre-built 3D Morphable Models (3DMMs) as described by V. Blanz and T. Vetter, in "A morphable model for the synthesis of 3d faces," in Proceedings of the 26th annual conference on Computer graphics and interactive techniques. ACM Press/Addison-Wesley Publishing Co., 1999, pp. 187-194; and described by J. Booth, A. Roussos, S. Zafeiriou, A. Ponniah, and D. Dunaway, in "A 3d morphable model learnt from 10,000 faces," in Proceedings of the IEEE Conference on Computer Vision and Pattern Recognition, 2016, pp. 5543-5552; and described by P. Huber, G. Hu, R. Tena, P. Mortazavian, P. Koppen, W. Christmas, M. Ratsch, and J. Kittler, in "A multiresolution 3d morphable face model and fitting framework," in Proceedings of the 11th International Joint Conference on Computer Vision, Imaging and Computer Graphics Theory and Applications, 2016.

3DMMs are the statistical 3D representations built on facial textures and shapes of many different subjects (e.g. 10,000 faces in "A multiresolution 3d morphable face model and fitting framework" by Booth et al.) by incorporating with their facial expressions and physical attributes at the same time. Once built, a 3DMM is ready for reconstruction according to facial attributes of a victim's face. The details of building a 3D face model could be found in "A multi-resolution 3d morphable face model and fitting framework" by Booth et al., but the overall pipeline is as follows. First, facial landmarks which express pose, shape and expression are extracted from the victim's face. Then, the 3DMM is reconstructed to match the landmarks from the 3D model and the face. Hence, pose, shape and expression of the face are transferred to the 3DMM. After reshaping the 3DMM, texture of the victim's face is conveyed to the 3D model. Since a 2D face photo/frame does not contain full representation of its 3D correspondence, a photo-realistic facial texture is generated from the visible face area in the photo/ frame for missing parts in the 3D representation, including as described by S. Saito, L. Wei, L. Hu, K. Nagano, and H. Li, in "Photorealistic facial texture inference using deep neural networks," arXiv preprint arXiv:1612.00523, 2016. Then, this 3D face is transferred into a VR environment to fulfill requested challenge tasks (e.g. smile, blink, rotate head etc.).

On the defense side against compromising attacks, even though some inertial sensor assisted methods increase the security of face authentication systems, such a compromised environment with given permissions yield attackers to use additional sensor data to manipulate the motion of 3D face model in VR environment. Another defense mechanism against these attacks, especially against VR based ones, could be analyzing the authentication media by using forensic techniques to detect forged audio/video. However, since 3D face models are created from scratch with high fidelity texture data, these methods could not detect any forgery on spoofing media. On the other hand, new approaches such as color filter array discrepancy of camera sensor noise or multi-fractal and regression analysis on discriminating natural and computer generated images could be used as countermeasures against 3D face model based attacks. However, attackers can extract genuine noise pattern or features from existing or captured images to embed them into generated video in a compromised device, thus, these defense mechanisms also fail against the disclosed threat model. Hence, defense mechanisms against compromised attacks should not rely on additional device data as suggested in previous works.

User authentication through audio response to text challenges was proposed by H. Gao, H. Liu, D. Yao, X. Liu, and U. Aickelin, in "An audio captcha to distinguish humans from computers," in Electronic Commerce and Security (ISECS), 2010 Third International Symposium on. IEEE, 2010, pp. 265-269. However, their goal is mainly to distinguish between natural and synthesized voice. Their results show that human responses can pass the system with 97% accuracy in 7.8 seconds average time while a very basic text-to-speech (TTS) tool (Microsoft SDK 5.13) can pass the system with 4% success rate. In contrast to the present disclosure and rtCaptcha, "An audio captcha to distinguish humans from computers" by H. Gao, H. Liu, D. Yao, X. Liu, and U. Aickelin in Electronic Commerce and Security (ISECS), 2010 Third International Symposium on. IEEE, 2010, pp. 265-269, uses plain-text challenges and thus allows the attacker to easily learn what is the task involved in the liveness detection challenge, and thus can be easily defeated by more sophisticated real-time synthesis of the victim's voice. Shirali-Shahreza, Y. Ganjali, and R. Balakrishnan, "Verifying human users in speech-based interactions" in Interspeech, 2011, pp. 1585-1588, proposed a scheme that involves audio CAPTCHAs. In their system, challenges are sent to users in audio formats and users give audio responses back to the system. They use audio features such as Mel-Frequency Cepstral Spectrum (MFCC) to correlate challenge and response audios at the decision side. They achieved 80% of authentication accuracy on average. However, since breaking audio CAPTCHAs are as easy as breaking plain-text challenge by using a speech-to-text application, this work also does not provide good defense against compromising attacks. One of the advantages of the present disclosure is that it can bind a text-based CAPTCHA challenge response with user's biometric data in the realm of audio/visual liveness detection.

Figure 2:
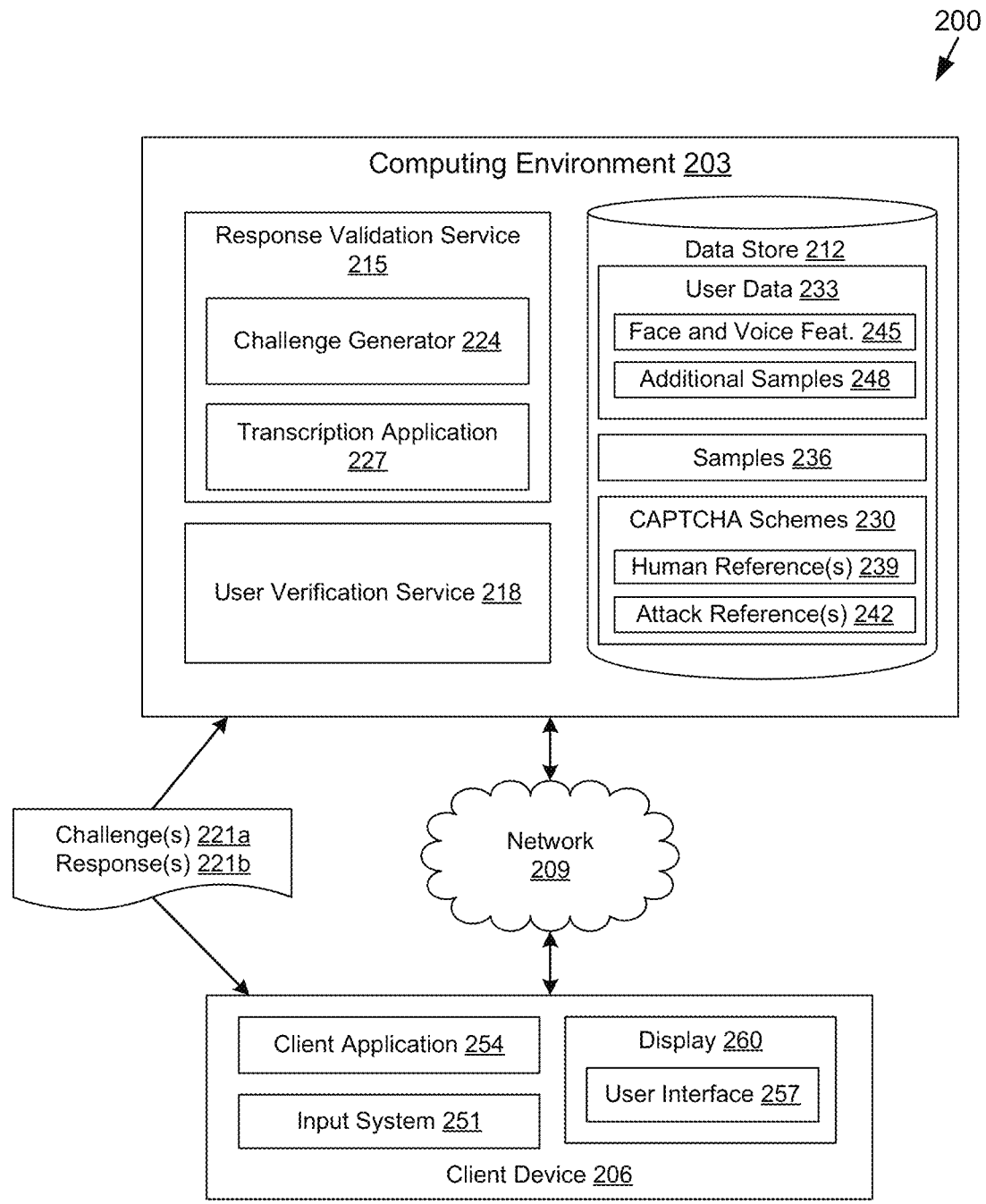
FIG. 2 is a schematic block diagram of a system according to various examples of the present disclosure.

Moving on to FIG. 2, shown is a system 200 according to various examples of the present disclosure. The system 200 is also described herein as rtCaptcha. The system 200 includes a computing environment 203 and one or more client devices 206 in communication by way of network 209. The network 209 can include, for example, wide area networks (WANs), local area networks (LANs), wired networks, wireless networks, other suitable networks, or any combination of two or more networks. For example, the network 209 can include satellite networks, cable networks, Ethernet networks, and other types of networks.

The computing environment 203 can be a computing environment that is operated by an enterprise, such as a business or other organization. The computing environment 203 can include, for example, a server computer, a network device, or any other system providing computing capabilities. Alternatively, the computing environment 203 can employ multiple computing devices that can be arranged, for example, in one or more server banks, computer banks, or other arrangements. The computing devices can be located in a single installation or can be distributed among many different geographical locations. For example, the computing environment 203 can include multiple computing devices that together form a hosted computing resource, a grid computing resource, or any other distributed computing arrangement. The computing environment 203 can be located remotely with respect to the client device 206.

Various applications and/or other functionality can be executed in the computing environment 203. The data store 212 can be representative of a plurality of data stores 212 as can be appreciated. The data stored in the data store 212, for example, is associated with the operation of the various applications and/or functional entities described below.

The components executed on the computing environment 203 can include a response validation service 215, a user verification service 218, and other applications, services, processes, systems, engines, or functionality not discussed in detail herein. The response validation service 215 is executed to generate and send challenges 221a to the client device 206, and analyze a response 221b provided by the client device 206. The response validation service 215 can use the challenge generator 224 to generate a CAPTCHA or other challenge 221a. The response validation service 215 can also determine whether a response 221b is a correct response.

For example, the response validation service 215 can apply a transcription application 227 to the response 221b to create an output that includes a transcription of the response 221b. Then, the response validation service 215 can compare the output to a solution to the challenge 221a to determine that the response 221b is a correct response. The response validation service 215 can also determine a response time associated with the client device 206 submitting the response 221b.

The user verification service 218 is executed to perform face and voice verification of a user during registration, authentication, or another phase associated with the system 200. For example, the user verification service 218 can execute during registration to check that a new user is not a duplicate, and to store face and voice data about the user in the data store 212. The user verification service 218 can execute during an authentication phase to perform face and speaker recognition by verifying the user's face and voice data from the registration phase.

The data stored in the data store 212 includes, for example, CAPTCHA schemes 230, user data 233, and samples 236, and potentially other data. CAPTCHA schemes 230 can include human reference(s) 239 and attack reference(s) 242. The CAPTCHA schemes 230 describe aspects of or related to the challenges 221a that can be generated by the challenge generator 224. For example, CAPTCHA schemes 230 can describe a category, a type, or a difficulty of the challenges 221a. Text-based CAPTCHAs can be categorized as character isolated (CI) schemes, hollow character schemes, or crowding characters together (CCT) schemes, as further described in a section below. Challenges 221a generated by the challenge generator 224 can also include challenging a user to perform some recognizable action such as to blink, or smile.

Human reference(s) 239 can include a reference time period within which a human is expected to be able to solve a challenge related to one of the CAPTCHA schemes 230. Attack reference(s) 242 can include a reference time period within which an attacker could break a challenge related to one of the CAPTCHA schemes 230.

User data 233 can include face and voice features 245, and additional samples 248. User data 233 includes data about a user of the system 200. For example, a user can register with the system 200 to create samples of the user's face and voice. The system 200 can extract features from the samples, such as face and voice feature vectors, and store them as face and voice features 245 for the user. The face and voice features 245 can then be used for comparison to other samples, such as samples received during authentication. Samples received during registration, authentication, or some other phase, can also be stored as additional samples 248 to improve the user's face and voice profile for future authentication.

Samples 236 can store samples of a face or voice associated with a response 221b. For example, the response validation service 215 can obtain a number of camera snapshots showing a face that is possibly related to the response 221b. The samples 236 can also store a video related to the response 221b.

The client device 206 can represent multiple client devices 206 coupled to the network 209. The client device 206 includes, for example, a processor-based computer system. According to various examples, a client device 206 can be in the form of a desktop computer, a laptop computer, a personal digital assistant, a mobile phone, a smartphone, or a tablet computer system.

The client device 206 can execute an operating system, such as WINDOWS, IOS, or ANDROID, and has a network interface in order to communicate with the network 209. The client device 206 has an input system 251 that can include one or more input devices, such as a keyboard, keypad, touch pad, touch screen, microphone, scanner, mouse, joystick, camera, one or more buttons, etc. In the context of this disclosure, the input system 251 can include a microphone and camera for capturing a response 221b to the challenge 221a.

The client device 206 can execute a client application 254 that can render content to a user of the client device 206. The client application 254 can obtain a challenge 221a sent by the response validation service 215 and render the challenge 221a in a user interface 257 on the display 260. The response validation service 215 can cause the client application 254 to capture images or audio using the input system 251.

Additional discussion will now be presented about how the system 200 can defend against powerful, automated attacks on facial authentication systems according to embodiments of the disclosure. The disclosed system 200 addresses several problems with existing systems. Many advanced systems use either CAPTCHA, face-, or speaker-based approaches to liveness detection and authentication that are vulnerable to sophisticated computerized attacks.

Said another way, many existing systems can be compromised without a human in the loop of the attack. Further, examples of the system 200, including features described with reference to FIG. 7 below, provide advantages over CAPTCHA, face-, and speaker-based approaches to liveness detection. Advantages of the system 200 include the ability to capture samples while varying the "task" involved in the challenge, and to delay evaluation of face and voice features of a user, among other advantages.

By way of context, an evaluation of current systems against compromising attacks is presented. This disclosure tested systems against compromising attacks of different level of sophistication in terms of how they create the impersonating video/audio of the victims, using open source spoofing datasets.

Face Authentication Systems

Figures 3, 4:
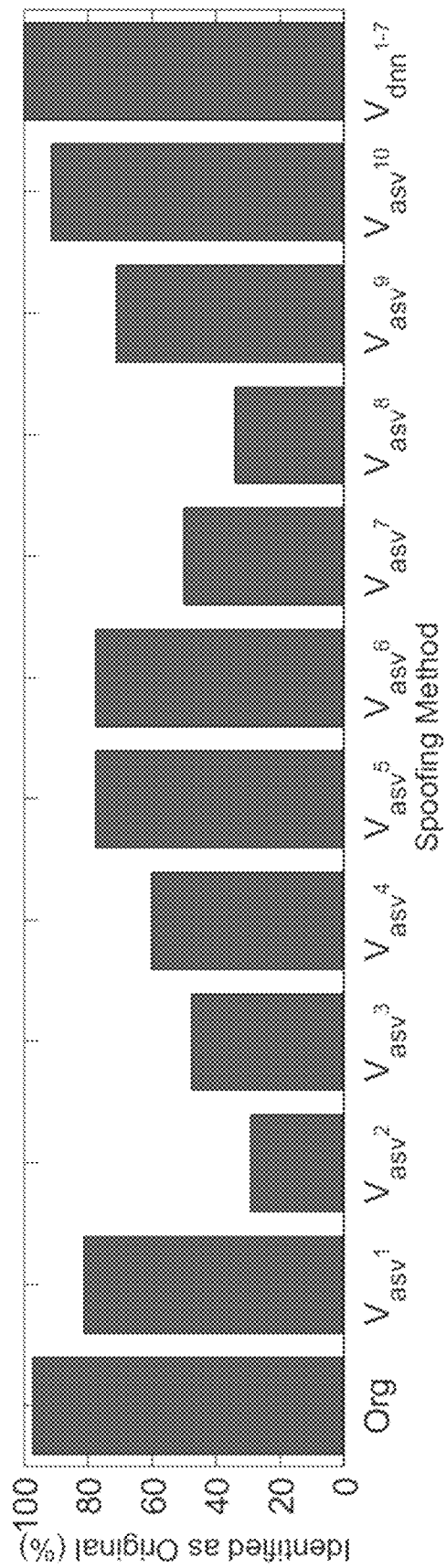
FIG. 3 is a table showing examples of spoofing results of cloud-based face authentication systems according to various examples of the present disclosure.
FIG. 4 is a chart showing success rate of speaker spoofing attacks according to various examples of the present disclosure.

Referring now to FIG. 3, spoofing results of cloud-based face authentication systems are presented. Systems included those provided or funded by Microsoft, Amazon, AliPay and Kairos.

Database: Several systems were tested against videos showing real/fake faces. Examples include subjects from the open source CASIA Face Anti-Spoofing Database by Z. Zhang, J. Yan, S. Liu, Z. Lei, D. Yi, and S. Z. Li, "A face antispoofing database with diverse attacks," in Biometrics (ICB), 2012 5th IAPR international conference on. IEEE, 2012, pp. 26-31. In particular, genuine videos from the CASIA Face Anti-Spoofing Database were taken and: 1) used as positive samples to test the studied systems, and 2) used as samples for generating synthesized videos, and used as negative samples against the tested systems. Some examples of this disclosure used the first 10 subjects from the CASIA database.

Synthesizing methods: Several systems were tested against videos synthesized using methods of different levels of sophistication. The synthesizing techniques employed can be summarized from the most complex to the simplest as follows: 1) 3D Face Model: This is a sophisticated method for generating fake face video for the purpose of compromising attacks. For experiments, 3D face models were generated from genuine videos of subjects in a dataset by using three different tools: i) Surrey Face Model (labeled $3D_{sf}$), a multi-resolution 3DMM and accompanying open-source tool such as described by P. Huber, G. Hu, R. Tena, P. Mortazavian, P. Koppen, W. Christmas, M. Ratsch, and J. Kittler, "A multiresolution 3d morphable face model and fitting framework," in Proceedings of the 11th International Joint Conference on Computer Vision, Imaging and Computer Graphics Theory and Applications, 2016), ii) Face-Gen8 ($3D_{fg}$) and iii) demo version of CrazyTalk89 ($3D_{ct8}$) commercial tools used for 3D printing or rendering 3D animation and game characters. Although the demo tool puts a brand mark on 3D models, they don't seem to have any effect on the effectiveness of the attack.

2) Cartoonized and Sketch Photos: To detect whether the face authentication systems check the texture information or not, randomly grabbed frames from the genuine videos were converted to cartoonized and sketch forms. These manipulations are expressed with $2D_{car}$ and $2D_{ske}$, respectively.

3) Fake Eyes/Mouth Photo: Finally, eyes and mouth regions of the stationary photos were replaced with fake ones which are cropped from an animation character. This attack method was conducted to prove that some face authentication and verification systems only focus on the location of facial attributes. To create an appropriate fake eyes and mouth, the facial landmarks can be extracted to get their regions. Afterwards, fake eyes and mouth templates can be reshaped to exactly fit their corresponding regions. This manipulation is represented by $2D_{fem}$ in the evaluation results.

Methodology: First, a subject was enrolled with his genuine face sample. Each service was presented with the synthesized videos. To make the experiment more realistic, the synthesized videos were generated using samples different from those used for registration. The success rate of each synthesis technique and its overall similarity rates (which is the tested service's measure of how close the presented video is to the one from registration) is presented in FIG. 3. Since most of the services accept 50% of similarity rate for correct verification, this threshold was also considered in experiments.

Findings: Before giving detailed findings, it should be noted that the analyzed services can be vulnerable against almost all the tested synthesis techniques. Results show that 92.5% of the spoofed faces are detected as genuine copies with an average similarity rate of 79%. More specifically, Cartoonized and Sketch photo attacks showed that the texture information is not considered in the authentication process at these systems. The lower matching rate in Sketch photo attack is likely due to the tested services not being able to detect facial region on those samples. The success of attacks as simple as Cartoonized and Sketch photo attacks highlights that attackers can succeed without putting in effort to build a high fidelity facial texture which can add to the latency in generating the synthesized video to answer the liveness detection challenge presented. Moreover, results of fake eyes/mouth spoofing amusingly proved that all of these systems are only using the landmark locations as the facial feature set on their face authentication protocol. 3D face model spoofing results also support these outcomes since these experiments used non-sophisticated tools to create 3D models and facial textures. Even though the demo software puts some brand labels over the generated face, very high similarity rates were obtained with these 3D models. Hence, faces created by a latest 3D face model generation software are very unlikely to be detected as fake by these services. As a result, one can infer that even if a face authentication scheme uses a challenge-response based liveness detection mechanism such as smile/blink detection accompanying with one of these services, it will be very easy to spoof such a scheme even by conducting a rough switching frame manipulation (e.g. when asked to blink, go from a frame with open eyes to one with close eyes for a short time) or using a demo application to create 3D face model and manipulate the model to answer the challenge. Some examples have shown that even a crude attack without using any sophisticated tool or algorithm can defeat using smile-detection as a liveness clue and MS Face API to authenticate a user's face.

Voice Authentication Systems

Turning now to FIG. 4, shown are examples of success rate of speaker spoofing attacks to Microsoft Speaker Identification (SI) service (e.g., Microsoft Cognitive Services or Microsoft Speaker Recognition API). Automatic speaker verification (ASV) systems also have similar vulnerabilities to compromising attacks as their facial recognition counterparts. To make a clear demonstration, several systems were systematically attacked with synthesized voices on the Microsoft SI service by using open sourced synthesized speech data sets.

Database: In experiments, two different datasets were used. First one is ASV Spoofing Challenge dataset ($V_{asv}$) which contains both genuine and synthesized voice samples for a total of 106 male and female users as described by Z. Wu, T. Kinnunen, N. Evans, J. Yamagishi, C. Hanilc, i, M. Sahidullah, and A. Sizov, "Asvspoof 2015: the first automatic speaker verification spoofing and countermeasures challenge," in Training, vol. 10, no. 15, p. 3750, 2015. Synthesized samples in the ASV Spoofing Challenge dataset are generated by 7 voice conversion (VC) and 3 speech synthesizing (SS) techniques. The dataset from the DNN based speaker adaptation work by Wu et al. ($V_{dnn}$) was also used. This dataset includes both genuine and synthesized samples for one female and one male speakers, where the synthesized speech samples that generated by using 7 different settings of their DNN framework.

Methodology: Ten (10) users were enrolled using their genuine samples from the two datasets, (2 users from $V_{dnn}$ and 8 randomly selected users from $V_{asv}$), each with a total of 30 seconds of speech samples. The targeted service were then tested against 10 genuine samples from the enrolled user, as well as 7 (for $V_{dnn}$) or 10 (for $V_{asv}$) synthesized samples generated for the enrolled user by each tested technique, and see if each tested sample is successfully identified as the enrolled user.

Findings: FIG. 4 presents the genuine identification results for the genuine samples, synthesized samples generated by 10 different methods in the $V_{asv}$ dataset and 7 different DNN methods in the $V_{dnn}$ dataset from left to right.

The $V_{dnn}^{1-7}$ gives the average result for 7 DNN based synthesizers in $V_{dnn}$ dataset. First, it can be noted that 97% of the genuine samples were identified correctly. Hence, it shows that the cloud service is working accurately for the recognition tasks. On the other hand, samples synthesized by various tested SS and VC methods have an average success rate of 64.6%. More specifically, even with the worst performing VC tool, there are still 28.75% of the synthesized samples identified to be from the real enrolled user. Additionally, samples from open sourced TTS synthesizers (10th method of $V_{asv}$) can have a 90% chance of being considered legitimate. Finally, if an adversary generate synthesized voice of a victim by using a DNN based approach, the SI service identify the forged speakers as a genuine one 100% of time (this is true for all methods/settings in $V_{dnn}$). The results also prove that the parameter space to synthesize is bigger than those which used by verification methods. That is why, even the simplest VC approach can tune the voice characteristics of the victim to the level of verification systems' requirements.

Approach

Figure 5:
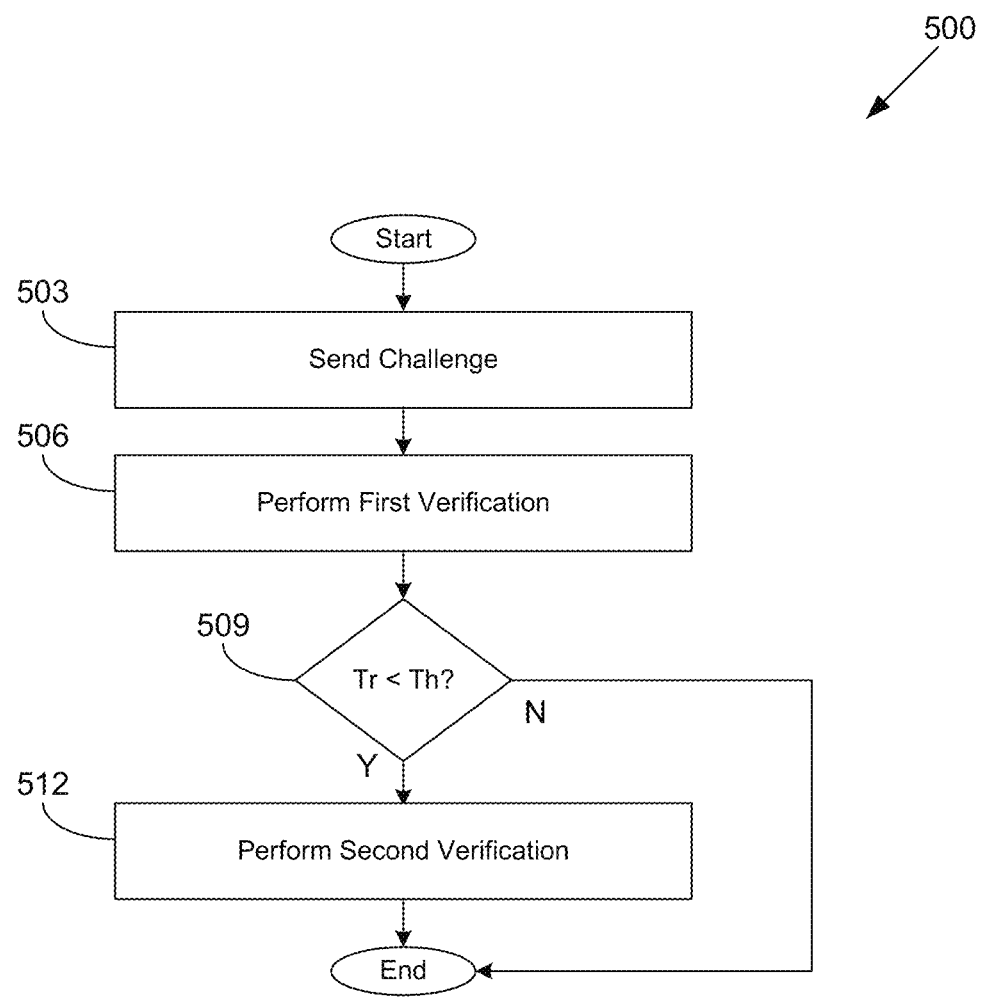
FIG. 5 is a drawing of a flowchart illustrating a method according to various examples of the present disclosure.

Referring next to FIG. 5, shown is a flowchart that provides one example of the operation of the system 200 according to various embodiments. Alternatively, the flowchart of FIG. 5 may be viewed as depicting steps of an example of a method 500 implemented to defend against powerful, automated attacks on facial authentication systems (FIG. 2).

Beginning with box 503, the response validation service 215 can determine a challenge scheme 230 (FIG. 2) to use based on any of a number of factors such as a preferred difficulty level or hardness level for liveness detection. In response to the challenge generator 224 generating a challenge 221a associated with the challenge scheme 230, the response validation service 215 can send the challenge 221a to the client device 206. The response validation service 215 can also receive the response 221b sent by the client device 206.

The the response validation service 215 can also cause the client application 254 to capture a number of face and voice samples associated with the response 221b. The number or a frequency of the samples can be based on a category, a type, a difficulty, a human reference 239, or an attack reference 242 associated with a particular CAPTCHA scheme 230. In this way, samples can be captured at seemingly random times while the user is responding to the challenge 221*a*.

Figure 9:
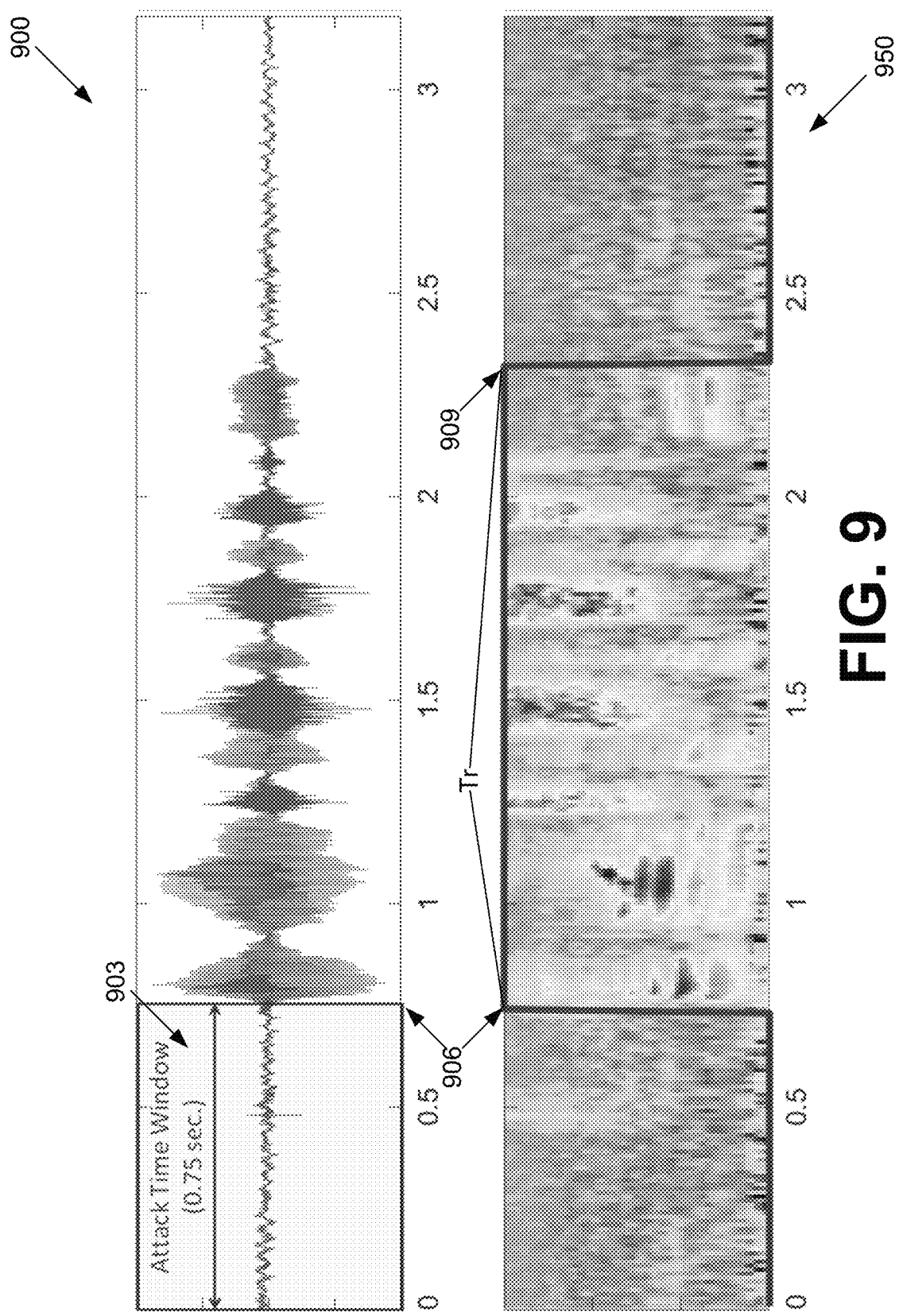
FIG. 9 depicts a waveform and spectrogram for a speech activity detection of a system according to various examples of the present disclosure.

At box 506, the system 200 can perform a first verification for liveness detection. The response validation service 215 can extract samples 236 that are associated with the response 221*b*. For example, the response 221*b* can include face and voice samples captured by the client device 206. The response validation service 215 can transcribe the samples 236 using the transcription application 227 to see if the response 221*b* is a correct response to the challenge 221*a*. The response validation service 215 can determine a response time (e.g., Tr as shown in FIG. 9 and described below) for the response 221*b* based at least in part on the samples 236. In some examples, response time (Tr) can be determined by performing a speech activity detection on the response 221*b*.

If, at box 509, the response validation service 215 determines that the response time (Tr) is within a threshold (Th), the process can continue to box 512. Otherwise, the process can continue to completion. The threshold (Th) can for example be based at least in part on a human reference value comprising a time period associated with a human solving the challenge, an attack reference value comprising a time period associated with an attack solving the challenge, or some other reference value. Examples of the system 200 can include the threshold (Th) being a predefined number of seconds (e.g., 5 seconds or $Th_{legit}$ as discussed further below).

At box 512, the system 200 can perform a second verification for liveness detection. The user verification service 218 can extract a face feature and a voice feature (e.g., face & voice feature vector) from the samples 236 associated with the response 221*b*. For a new registration, for example, the response validation service 215 can check whether the user is a duplicate within the user data 233. In some other examples, the response validation service 215 can compare the extracted face feature or the extracted voice feature to face and voice features 245 of a registered user. Thereafter, the process proceeds to completion.

Figure 6:
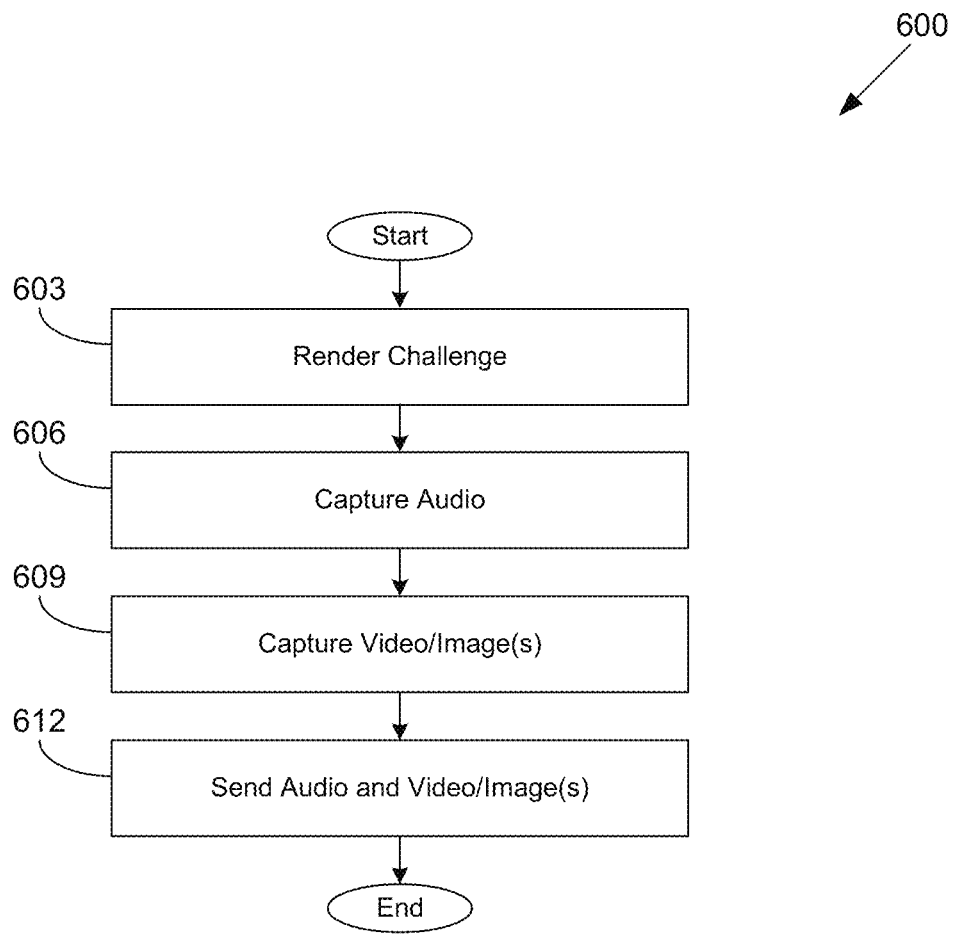
FIG. 6 is a drawing of a flowchart illustrating a method according to various examples of the present disclosure.

Referring next to FIG. 6, shown is a flowchart that provides one example of the operation of the system 200. Alternatively, the flowchart of FIG. 6 may be viewed as depicting steps of an example of a method 600 implemented by the client device 206 (FIG. 2).

Beginning with box 603, the client device 206 can execute the client application 254 to obtain a challenge 221*a* sent by the computing environment 203. The client application 254 can render the challenge 221*a* in the user interface 257 on the display 260.

At box 606, the client application 254 can capture audio of a user responding to the challenge 221*a*. At box 609, the client application 254 can capture video or images associated with the user responding to the challenge 221*a*, such as by capturing some images of the user's face while answering the challenge 221*a*. While the audio and the video can be captured individually, the client application 254 can in some examples capture a video comprising audio, as can be appreciated. At box 612, the client application 254 can send the audio or the video/image(s) to the computing environment 203. Thereafter, the process proceeds to completion.

Figure 7:
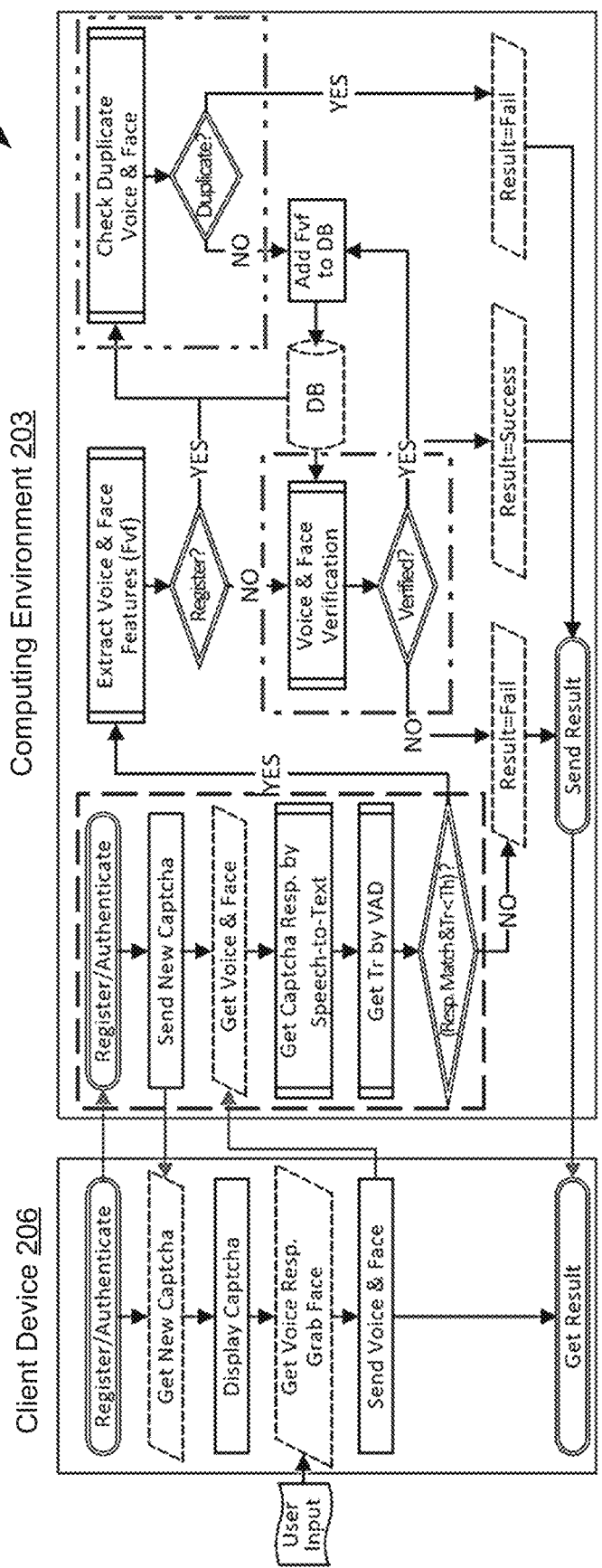
FIG. 7 is a drawing of a flowchart for a system according to various examples of the present disclosure.

FIG. 7 shows a summary of a diagram for an example workflow 700 for the system 200 according to various embodiments. Alternatively, the process flow diagram of FIG. 7 may be viewed as depicting example operations of the computing environment 203 (FIG. 2) and the client device 206 (FIG. 2). The workflow 700 refers to user response time (Tr), human response time threshold (Th) and face & voice feature vector (Fvf), for example as described in the following. The workflow 700 can start when a client device 206 starts an authentication or registration session. The client device 206 can establish a secure connection with the computing environment 203 through the network 209 (FIG. 2). Upon receiving requests, the response validation service 215 (FIG. 2) will generate and send a CAPTCHA challenge 221*a* (FIG. 2) to the client device 206 and measure the time until the client device 206 responds. The session can time out if no response is received during a predefined period of time.

Once the client device 206 receives the CAPTCHA or other challenge 221*a* (FIG. 2), it will display the challenge 221*a* to the user on the display 260 (FIG. 2) and start recording the user's audio response via the input system 251. The client application 254 running on the client device 206 will also capture a number of samples (e.g., snapshots) of the user at while he/she is responding to the challenge 221*a* (e.g., using a front camera on the client device 206).

The system 200 may cause the client application 254 to capture samples at various times while the user is responding to the challenge 221*a*. One example includes the client application 254 capturing samples at random (or seemingly random) times. The system 200 can cause the client application 254 to capture a number of face and voice samples that is between a predefined minimum number and predefined maximum number.

In another example, the number or a frequency of samples can be based on a category, a type, a difficulty, a human reference 239, or an attack reference 242 associated with a particular CAPTCHA scheme 230. In this way, the client application 254 can capture samples at seemingly random times while the user is responding to the challenge 221*a*.

A voice recognition system of the client device 206 can determine when the user has finished responding to the CAPTCHA challenge 221*a*. The captured voice and face samples 236 will then be sent to the computing environment 203. To avoid unnecessarily utilizing a more computationally-expensive voice/face recognition service, the computing environment 203 can perform an initial check of the response 221*b* by transcribing the audio response received using the transcription application 227 which can include speech-to-text (STT) library, and determine if the response 221*b* corresponds to the solution to the CAPTCHA challenge 221*a* that was sent. The system 200 can also determine how much time it takes for the user to start responding to the challenge 221*a* by determining when did the first speech activity happened in the response 221*b*. If the user took too long to start responding, the system 200 can consider the liveness test a failure and reject the authentication or registration request. If the response 221*b* passes the preliminary checks, the system 200 can perform a second analysis, such as a more computationally-expensive analysis, to determine the validity of the voice and face samples received as samples 236. The workflow 700 can vary depending on whether the request is for authentication or registration, as further described below.

Registration: Analysis for registration can involve a check of the received samples 236 to make sure they came from a real human being to further avoid bot registration and to avoid wasting resources to establish accounts for non-existent/non-human users. The system 200 can match the samples 236 against that of existing users to detect attempts to register multiple accounts for the same person. If the samples 236 are not a duplicate, the system 200 can proceed to create the new user account and store the received face and voice samples as face and voice features 245 associated with that user.

Authentication: For authentication requests, if the user is trying to authenticate as user X, the system 200 will compare the received samples 236 against the face and voice features 245 received at the establishment of account X. If the samples 236 are verified as coming from user X, the system 200 can confirm the liveness and authenticity of the request. For example, liveness can be confirmed because the challenge 221a has been answered correctly, and authenticity has been confirmed through comparing samples 236 with face and voice features 245. Thus, the system 200 can cause the client application 254 to report to the user that the authentication is successful. Upon successful authentication of a user, the system 200 can also grant access to a resource including by letting the user log in as user X. The system 200 can associate the received samples 236 as additional samples 248 in the user data 233 to improve the user's face and voice profile for future authentication. In some other examples, the system 200 can deny access to the resource. Using the workflow 700, the system 200 can prevent an adversary from launching automatic, large scale user impersonation using a compromised client device 206.

CAPTCHA Challenge

FIG. 8 summarizes different CAPTCHA schemes 230 that can be employed by the system 200. For example, the system 200 can employ various types of the challenge generator 224 to generate a challenge 221a and fine-tune the difficulty level for liveness detection. As a brief introduction to CAPTCHA schemes 230, text-based CAPTCHAs can be classified into three different categories according to font styles and positional relationships between adjacent characters; the three categories are, namely, character isolated (CI) schemes, hollow character schemes and crowding characters together (CCT) schemes as described by H. Gao, J. Yan, F. Cao, Z. Zhang, L. Lei, M. Tang, P. Zhang, X. Zhou, X. Wang, and J. Li, "A simple generic attack on text captchas," in NDSS, 2016. Some CAPTCHA providers also use variable character sizes and rotations or different kinds of distortions and background noises to make their CAPTCHA harder to break. For experiments, the CAPTCHA samples used by Gao et al. can be used.

Several example CAPTCHA schemes 230 that can be employed by the challenge generator 224 include: reCAPTCHA which is a CCT scheme used by LinkedIn, Facebook, Google, YouTube, Twitter, Blogspot, and WordPress, among other sites; Ebay which is a CCT scheme used by ebay.com; Yandex which is a Hollow scheme used by yandex.com; Yahoo! which is a Hollow scheme used by yahoo.com; Amazon which is a CCT scheme used by amazon.com; Microsoft which is a CI scheme used by live.com and bing.com. In other examples, the challenge generator 224 can include a version of the Cool PHP Captcha framework modified to create variable size CAPTCHAs of short phrases or numbers that include random lines on background. Cool PHP Captcha is available at https://github.com/josecl/cool-php-captcha.

In another example, the challenge generator 224 can generate a challenge 221a that is based on a preferred difficulty level or hardness level for liveness detection. Research has shown for example that a human reference 239 for an average Internet user that can solve text and numeric CAPTCHAs in hollow schemes 230 and CCT schemes 230 is around 20 seconds in average (3 secs. min.). Research also shows that CAPTCHA solving time is correlated with education and age. However, previous findings focus on the scenario where the user has to type in the answer to the CAPTCHA. One advantage of the system 200 is that the user is allowed to speak out the response to the challenge 221a, which can be faster and easier than typing an answer to the challenge 221a. Thus, how long it takes users to complete the liveness challenge can be determined.

Transcribing CAPTCHA Responses

The face and voice samples 236 received for the liveness test can be validated. The system 200 can transcribe the voice sample using a speech-to-text (STT) algorithm to see if it is a correct response to the challenge 221a. In the system 200, a Hidden Markov Model (HMM) based approach with a pre-trained dictionary can be used. For example, the open-source CMU Pocketsphinx library, Carnegie Mellon University's Sphinx speech recognition system described by D. Huggins-Daines, M. Kumar, A. Chan, A. W. Black, M. Ravishankar, and A. I. Rudnicky, "Pocketsphinx: A free, real-time continuous speech recognition system for handheld devices," in Acoustics, Speech and Signal Processing, 2006. ICASSP 2006 Proceedings. 2006 IEEE International Conference on, vol. 1. IEEE, 2006, pp. I-I, can be used. The CMU Pocketsphinx library is lightweight and suitable for working on mobile devices. Also, CMU Sphinx is a preferred solution among HMM based approaches. There are also many sophisticated alternatives. For example, recently Baidu's open source framework Deep Speech 2 exceeds the accuracy of human beings on several benchmarks. They trained a deep neural network (DNN) system with 11,940 hours of English speech samples. Cloud based cognitive services such as Microsoft Bing Speech API or IBM Watson Speech to Text could also be used as STT algorithm for this step. However, network latency caused by audio sample transmission could be a drawback.

Audio Response Validation

FIG. 9 depicts details of a speech activity detection of the system 200 for a verified audio response of the challenge 221a. The system 200 can perform a verification process to determine user response time to the challenge 221a. Analysis shows that giving an audible response is faster than typing-based responses. Furthermore, the attacker's time window for breaking the challenge 221a and synthesizing a victim's face and challenge announcing voice is smaller than even the duration of audible response. FIG. 9 depicts an example waveform 900 of the system 200. The waveform 900 includes a time window 903 for adversarial action that is limited with the beginning of a speech activity of the waveform 900. The time window 903 shown in FIG. 9 coincides with a start time of a speech activity in the response.

Speech activity detection, also referred to as voice activity detection (VAD), is a method that has been studied and discussed in different contexts such as audio coding, content analysis and information retrieval, speech transmission, automatic segmentation and speech recognition, especially in the noisy environments. The system 200 can use a hybrid model that follows a data driven approach by exploiting different speech-related characteristics such as spectral shape, spectro-temporal modulations, periodicity structure and long-term spectral variability profiles. Regarding long-term spectral variability profiles, M. Van Segbroeck, A. Tsiartas, and S. Narayanan, "A robust frontend for vad: exploiting contextual, discriminative and spectral cues of human voice," in INTERSPEECH, 2013, pp. 704-708, describes one approach. After getting different streams representing each of these profiles, the information of the streams are applied to the input layer of a Multilayer Perceptron classifier. The overall equal error rate of this approach is around 2% when a classifier is built with 30 hours data and tested on 300 hours data. Since most audio responses will be a few seconds, the error rate will be a few milliseconds either.

FIG. 9 also depicts a spectrogram 950 for speech activity detection of the audio response 221b of the challenge 221a. The system 200 can extract a response time (Tr) from the response 221b, such as by determining a start time 906 and an end time 909 for a speech activity in the response. If the response time (Tr) is within an expected human response time based on a human reference 239 for the particular CAPTCHA scheme 230 the system 200 can verify the response 221b as a genuine attempt. The system 200 can also verify the response 221b as a genuine attempt if the response time (Tr) is not longer than a breaking time based on an attack reference 242 for the particular CAPTCHA scheme 230. The human reference 239 (FIG. 2) can be stored for each CAPTCHA scheme 230 based on how long it takes a human to provide an answer to the CAPTCHA scheme 230. Since reading behavior could vary between users and CAPTCHA schemes 230, the human reference 239 can be adjusted or adapted based on factors associated with the user, such as his/her response times from the successful attempts. The attack reference 242 (FIG. 2) can also be stored for each CAPTCHA scheme 230 based on how long it takes an attacker to compromise or break the challenge 221a.

Face and Voice Verification

After getting a correct CAPTCHA response 221b within a response time that corresponds with a real human, the system 200 can verify user's face samples 236 by using data from the registration phase stored as face and voice features 245. If the attempt is new user registration, the system 200 can again make face and speaker recognition to check the new user is not a duplicate one. Face and speaker recognition and verification can generally fall into two categories; feature or descriptor based, and data driven DNN-based approaches. A verification service such as Microsoft Cognitive Services can also be used to verify user's audio/visual verification.

Evaluation

This section presents examples of results of evaluation on the system 200 to show that it provides a strong, yet usable, liveness detection to protect face/voice based authentication systems against compromising attacks. In particular, presented below are the results measuring the time difference between a real user solving the challenge 221a presented by the system 200 versus the time it takes for an algorithm to break the challenge 221a.

The client application 254 in some examples can present five different challenge response based liveness detections, where the user either has to read numbers or text presented on the display 260, or perform some actions in front of the client device 206. For example, a challenge 221a that is a text-based challenge will have the user read a number of phrases of two to three simple words. A challenge 221a that is a numeric challenge involves the user reading 6-digit numbers.

In some experiments, the responses 221b involved the users announcing the numeric or phrase challenges 221a out loud. To be more specific, five liveness detections were used to test the disclosed system 200, employing the following challenges 221a and schemes 230:

1) two text phrase and one numeric challenges 221a as plaintext scheme 230;
2) three numeric challenges 221a as CAPTCHA images with reCaptcha, Ebay and Yandex schemes 230;
3) three text phrase challenges in an animated CAPTCHA images with reCaptcha scheme 230. In this task, the client application 254 displayed challenge words individually by animating (e.g. sliding from left to right) them sequentially with small time delays. The idea behind this approach is to prevent the attacker from extracting the extract the CAPTCHA as moving targets. On the other hand, an animated CAPTCHA should be not too much more difficult than solving one at a fixed location for a human being. For example, CAPTCHA samples from "A simple generic attack on text captchas," by Gao et al. for Ebay and Yandex schemes can be used. To obtain reCaptcha samples that are either purely numerical or purely text (which are not included in the dataset from Gao et al.), the application generated them using Cool PHP Captcha tool which creates custom word CAPTCHAs in reCaptcha scheme 230;
4) challenge 221a to blink; and
5) challenge 221a to smile.

To improve the usability of the liveness detection, for tasks 1 to 3, the system 200 can present one challenge 221a at a time. The client application 254 used CMU Pocketsphinx library for real-time speech recognition on mobile devices to know when the user has finished attempting the current challenge 221a (by noticing the stop of utterance). Similarly, for challenges 4 and 5, the client application 254 used Google's Mobile Vision API to obtain smiling and blinking probability to determine when the user has answered the challenge 221a.

Thirty one (31) people volunteered to use an example of the system 200. Each participant was asked to answer 3 rounds of challenges 221a for each of the 5 different kinds of challenges 221a listed above (i.e. 15 challenges 221a in total). For each challenge 221a a timeout of 10 seconds was set. If the participant did not answer the challenge 221a in that time, the client application 254 would send a message to the computing environment 203 indicating a failure. For the first three types of challenges 221a, the user's audio responses and some facial frames were captured while answering the challenges 221a, as well as determining how long it takes to answer the challenge 221a and whether the answer is correct.

The face and voice data from responses to challenges 221a was also compared to face and voice features 245 to determine if it's the face and voice of the same user. For the fourth and fifth challenge type, the application measured and saved blink and smile detection time along with their probability.

Findings

Figure 10:
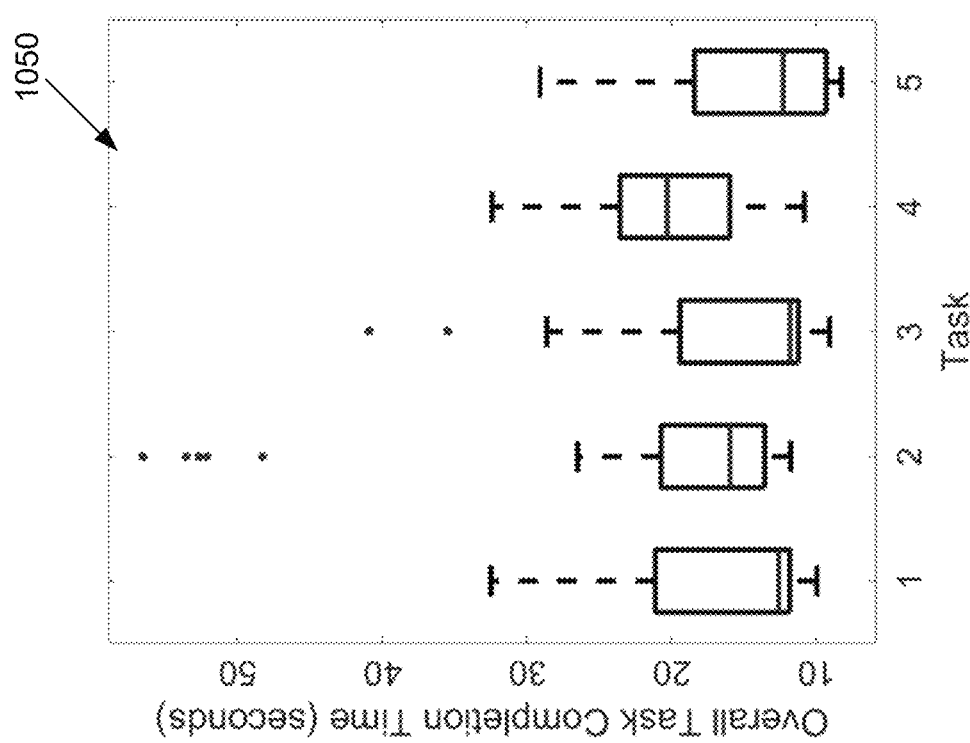
FIG. 10 depicts plots of response times of a system according to various examples of the present disclosure.
Figure 10:
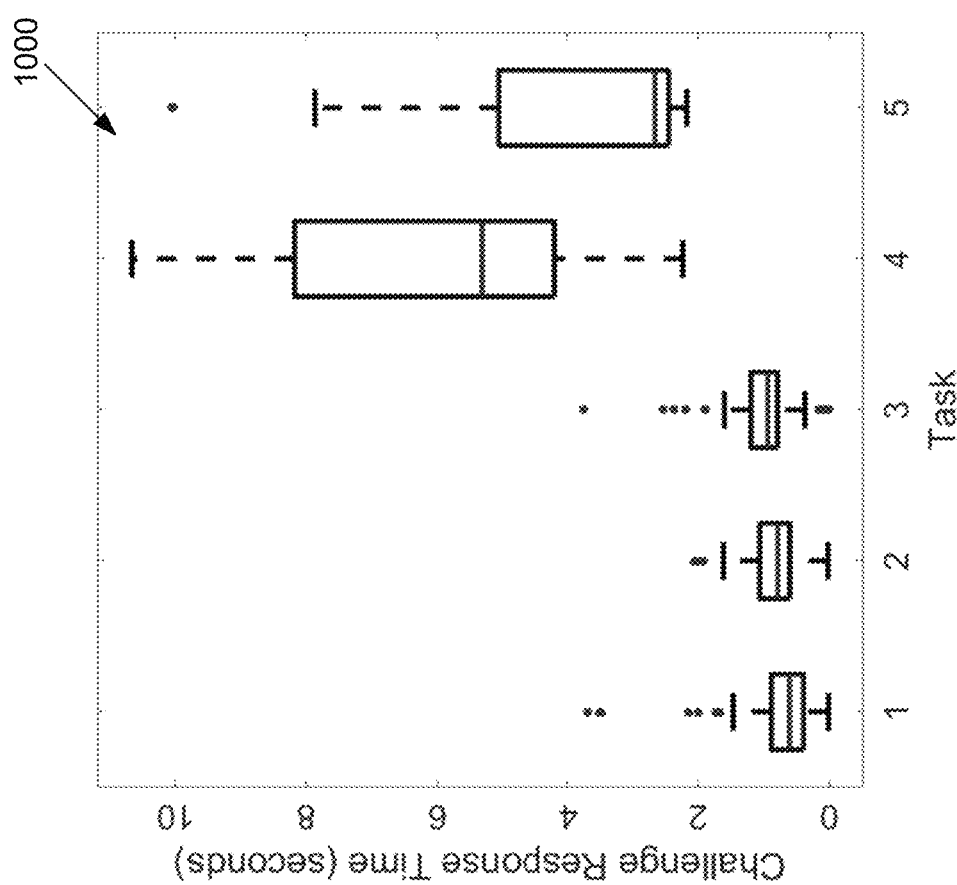

Referring now to FIG. 10, shown are plots of response times for tasks 1 through 5 (as described above) for each challenge 221a. FIG. 10 shows response time distributions (in seconds) of the participants, as well as overall time to answer all 15 challenges (in seconds). It is worth noting that participants correctly announced the CAPTCHA challenges 221a with an 89.2% overall accuracy and 0.93 seconds overall response time. The accuracy is much higher and the response time is excessively smaller than known CAPTCHA breaking algorithms (detailed in further sections). Moreover, all of the faces and voices are verified with 93.8% of an average accuracy and High confidence values, respectively.

Plot 1000 of FIG. 10 presents the response time distributions of the participants. While response (and detection) time to any type of challenge 221a which involves the user reading something are below two seconds, smile and blink the minimum time to detection for a smile or blink response is higher than the largest measured response time to any of the CAPTCHA challenges 221a (e.g., task 2 and 3). Experimental results show that CAPTCHA based liveness detection challenges does not increase the end-to-end time to authenticate a user over existing smile or blink based challenges. Plot 1050 of FIG. 10 shows there is no significant differences between participants for the overall time to answer all 15 challenges 221a.

FIG. 11 presents a chart of response times and successful recognitions of the challenges 221a with the disclosed system 200 (Human$_{aud}$), a human-powered CAPTCHA solving service (Attack$_{typ}$), an OCR-based (Attack$_{ocr}$) and a modern CAPTCHA breaking algorithms (Attack$_{best}$). The left most column (e.g., Human$_{aud}$) give the average response times and recognition accuracies of participants for each CAPTCHA scheme 230 in challenge type (or task) 1 to 3. Results show that participants' response time remains mostly constant over the different types of CAPTCHA schemes 230 tested, and is not significantly affected by the difficulty level of the CAPTCHA schemes 230. Similarly, recognition accuracies for the CAPTCHA schemes 230 varying from plain-text and Ebay CAPTCHA challenges to reCaptcha and Yandex CAPTCHAs differ only slightly. Moreover, while numeric CAPTCHA schemes 230 can have better accuracies than English phrase based CAPTCHA schemes 230, the difference is below 5%.

Additionally, when a user fails to correctly answer any kind of liveness detection challenge 221a, he/she can be asked to try again. FIG. 12 presents a measurement of how many times a participant has to re-try before a successful authentication under the different types of challenges 221a. Results show that in almost all cases, participants need to try at most two times to successfully respond to any kind of challenge 221a. There was one exception for one participant that was determined to be caused by the speech recognition algorithm.

Security Analysis

This section first presents analysis to determine how likely it is for an attacker to successfully evade the system 200 and impersonate the user. As mentioned with regards to threat model, it can be assumed that the attacker can compromise the kernel of the client device 206 and can have a malicious version of the client application 254 used for authenticating with the system 200. Furthermore, the attacker can also use the camera and microphone of the input system 251 to collect face and voice sample of the victim, and potentially build an accurate model for the victim's face and sound. Thus, when the system 200 presents the attacker with a challenge 221a, one obstacle the attacker faces in achieving successful authentication is to solve the challenge 221a before the authentication session times out; once the challenge 221a is solved, the already created face/voice model of the victim can be used to create video/audio of the victim saying the answer to the challenge 221a, and this fabricated answer can be sent to the computing environment 203 either by injecting it into the system 200 as outputs from the camera and the microphone (through a compromised kernel) or directly into a malicious version of the client application 254.

One key to considering the attacker's chance of success is a time out or threshold (Th$_{legit}$) for the system 200. Put it another way, the strength of the system 200 can be based at least in part a threshold that is a difference between a response time that gives legitimate human users a good success rate in authentication, versus a threshold that allows for accurate breaking of the challenge 221a.

Regarding setting a threshold or Th$_{legit}$, participants in one user study responded to 98.57% of the challenges in less than 3 seconds. Furthermore, evaluation results have shown that users have an overall accuracy of 87.1% for all tested CAPTCHA schemes 230, and there seems to be no correlation between their response time and their success rate. In other words, there was not a significant improvement in the user's rate of successfully answering the CAPTCHA even if Th$_{legit}$ is set significantly higher. Thus, the system 200 can assume a Th$_{legit}$ of 5 seconds.

Now, consider whether an attacker has a chance of breaking a CAPTCHA and successfully generate the video/audio of the victim answering the CAPTCHA with a session time out of 5 seconds. Consider also that different kinds of CAPTCHA breaking methods have different levels of sophistication. The most primitive CAPTCHA breaking method observed was OCR based. In particular, the CAPTCHA used in one user study was tested against one of the OCR based CAPTCHA solving websites. As presented in the Attack$_{ocr}$ columns of FIG. 11, the tested site could not solve any of the CAPTCHA challenges 221a. The tested site faced significant challenges decoding anything but plain-text. The challenges 221a presented by the system 200, including CAPTCHA images with background noise or distortions, could not be decoded by the tested site.

Experiments were also conducted on modern CAPTCHA breaking schemes from "A simple generic attack on text captchas," by Gao et al., and as described by E. Bursztein, J. Aigrain, A. Moscicki, and J. C. Mitchell, in "The end is nigh: Generic solving of text-based captchas." in WOOT, 2014, which are based on character segmentation and Reinforcement learning (RL) respectively. FIG. 13 summarizes their best decoding accuracy and solving times for various schemes on commodity laptops. The method described in "A simple generic attack on text captchas" by Gao et al. is very sophisticated because it proposes the most generic solution and appears to be the only published work that can defeat the Yandex scheme. The table of FIG. 11 referred to their system as Attack$_{best}$. While some results show that some CAPTCHA schemes 230 can be broken in around 3 seconds, their overall recognition accuracies can be very low (while the corresponding accuracies from the participants in one user study remain above 85%). Thus, setting Th$_{legit}$ at 5 seconds gives a good safety margin against compromising attacks that employ even an advanced CAPTCHA breaking scheme.

Semi-Automated Attacks

This disclosure also considers the possibility of breaking the system 200 using cloud-based, manual CAPTCHA solving services, since this is a commonly used attack method against many CAPTCHA schemes 230. In particular, attackers may try to use the client device 206 as a proxy and ship CAPTCHA solving task to real human workers. There are many human-powered CAPTCHA solving services reporting high recognition rates, as presented in FIG. 14. FIG. 14 presents a list of reported average decoding accuracy and time of typing based human responses to CAPTCHA challenges 221a.

Moreover, some experiments decoded one CAPTCHA dataset used in the user study through one of these systems to make a fair comparison. Average response times and decoding accuracies of this service for each scheme are presented under the Attack$_{typ}$ columns of FIG. 11. Regarding Attack$_{typ}$ presented in FIG. 11, an average solving time is 19.17 seconds (with 10.75 seconds at minimum) with 96.2% overall solving rate. As such, once again, an attacker trying to launch a compromising attacks based on one of the services listed in FIG. 14, or a similar service, will not be likely to beat the 5 second threshold for $Th_{legit}$, and that is true even if one does not consider other time overheads caused by a synthesizer, which has $T_{tts}$=1.1 seconds (TTS delay time) for example.

Other Security Benefits

While one prominent strength of the system 200 lies in presenting the attacker with a challenge 221a that is difficult to answer automatically, and thus nullifying an advantage the attacker may have in being able to generate authentic-looking/sounding video/voice of the victim and inject it into the authentication process at will, the system 200 comes with a surprising benefit over other liveness detection challenges like blinking and smiling: it is very difficult (if not impossible) to capture the user giving out a correct answer to a challenge 221a by accident. In particular, liveness challenges that are based on blinking and smiling are very vulnerable to attacks like UI redressing attacks. In some scenarios, the attacker can drive a legitimate authentication app to a state where it's presenting the user with its liveness detection (either by using Intent, which is harder to control for more than one UI, or using the accessibility service), while covering up the phone's display with an overlay (so the user doesn't know he/she is being attacked). With liveness challenge based on blinking or smiling, this attack is likely to be successful because people naturally blink and smile occasionally, and thus they will provide the answer to the underlying challenge and help the attacker to authenticate unknowingly. With the system 200, such overlay-based attack is unlikely to be successful because it is very unlikely that the victim will spell out the answer to the right challenge 221a by accident while the overlay is obscuring the screen and the underlying app is waiting for a response.

Further Discussion

One of the main security infrastructures in the disclosed framework relies on speech recognition since this disclosure can capture audio response 221b to the CAPTCHA challenges 221a. Hence, the STT algorithm must be robust enough to minimize the false negatives for legitimate user responses. The collected samples 236 in one user study involve ambient office, restaurant and outside environments with A/C sound, hums and buzzes, crowd and light traffic sounds. However, some samples 236 still have limited background noise variations to test the robustness of used STT method in experiments. Having said that, the disclosed system 200 can use other powerful STT approaches such as Deep Speech 2 by Baidu or cloud based solutions instead of (or in addition to) CMU Pocketsphinx library for noisy environments. Moreover, recent advances in lip reading (e.g. LipNet, such as those described by Y. M. Assael, B. Shillingford, S. Whiteson, and N. de Freitas, "Lipnet: Sentence-level lipreading," in arXiv preprint arXiv:1611.01599, 2016) provides around 95.2% of sentence level speech recognition accuracy by only using visual content. Combining such an approach with STT approach would probably give very accurate results on legitimate challenge responses. Moreover, using lip reading based speech recognition will also increase the usability of the system 200 considering to use it in a silent environment. As an example, the transcription application 227 can implement a lip reading method such as the above technique to determine that a response 221b is a correct response.

The present disclosure outlines several aspects of audio/visual authentication system and presents a system 200 to address several drawbacks of existing liveness detection systems. First, analysis on major cloud based cognitive services reveals that an applicable and spoof-resistant liveness detection approach is an urgent need. On the other hand, CAPTCHA based human authentication has been using successfully on the web applications more than a decade. One user study and comparative threat analysis with its results proves that the disclosed system 200 constitutes a strong defense against even the most scalable attacks involving latest audio/visual synthesizers and modern CAPTCHA breaking algorithms.

Figure 15:
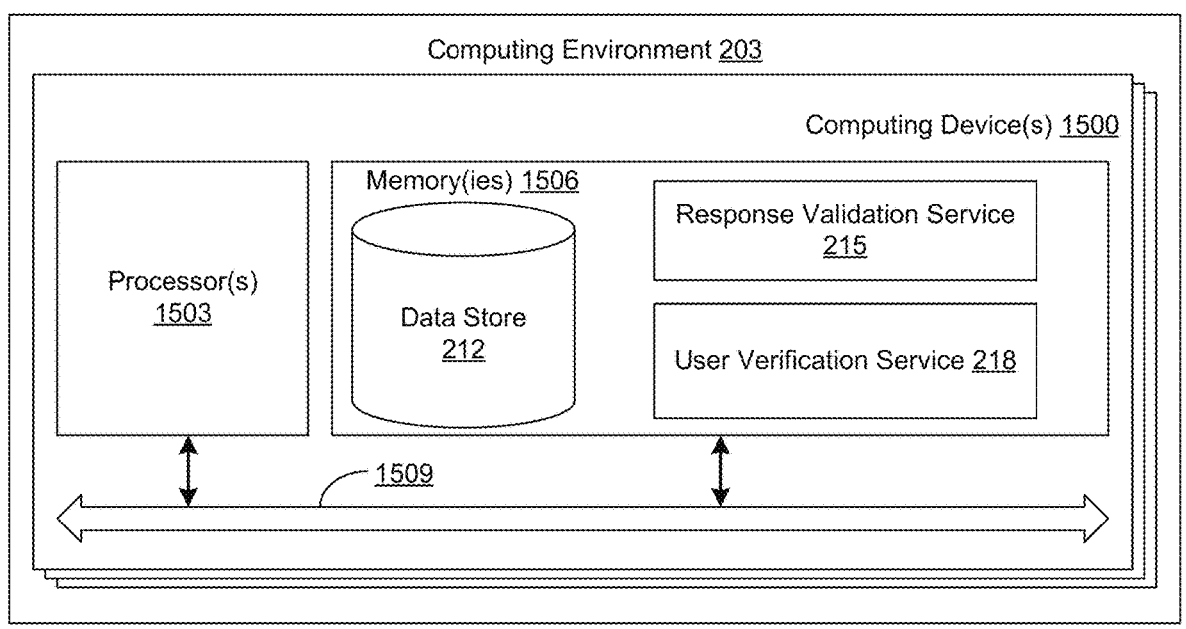
FIG. 15 is a schematic block diagram that provides one example illustration of a computing environment employed in the networked environment of FIG. 2 according to various examples of the present disclosure.

With reference to FIG. 15, shown is a schematic block diagram of the computing environment 203 according to an embodiment of the present disclosure. The computing environment 203 includes one or more computing devices 1500. Each computing device 1500 includes at least one processor circuit, for example, having a processor 1503 and a memory 1506, both of which are coupled to a local interface 1509. To this end, each computing device 1500 may comprise, for example, at least one server computer or like device. The local interface 1509 may comprise, for example, a data bus with an accompanying address/control bus or other bus structure as can be appreciated.

Stored in the memory 1506 are both data and several components that are executable by the processor 1503. In particular, stored in the memory 1506 and executable by the processor 1503 is the response validation service 215, the user verification service 218, and potentially other applications. Also stored in the memory 1506 may be a data store 212 and other data. In addition, an operating system may be stored in the memory 1506 and executable by the processor 1503.

It is understood that there may be other applications that are stored in the memory 1506 and are executable by the processor 1503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages. Additionally, it is understood that terms such as "application," "service," "system," "engine," "module," and so on may be interchangeable and are not intended to be limiting.

A number of software components are stored in the memory 1506 and are executable by the processor 1503. In this respect, the term "executable" means a program file that is in a form that can ultimately be run by the processor 1503. Examples of executable programs may be, for example, a compiled program that can be translated into machine code in a format that can be loaded into a random access portion of the memory 1506 and run by the processor 1503, source code that may be expressed in proper format such as object code that is capable of being loaded into a random access portion of the memory 1506 and executed by the processor 1503, or source code that may be interpreted by another executable program to generate instructions in a random access portion of the memory 1506 to be executed by the processor 1503, etc. An executable program may be stored in any portion or component of the memory 1506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1506 is defined herein as including both volatile and nonvolatile memory and data storage components. Volatile components are those that do not retain data values upon loss of power. Nonvolatile components are those that retain data upon a loss of power. Thus, the memory 1506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1503 may represent multiple processors 1503 and/or multiple processor cores and the memory 1506 may represent multiple memories 1506 that operate in parallel processing circuits, respectively. In such a case, the local interface 1509 may be an appropriate network that facilitates communication between any two of the multiple processors 1503, between any processor 1503 and any of the memories 1506, or between any two of the memories 1506, etc. The local interface 1509 may comprise additional systems designed to coordinate this communication, including, for example, performing load balancing. The processor 1503 may be of electrical or of some other available construction.

Although the response validation service 215, the user verification service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable on at least one computing device, wherein the program, when executed, causes the at least one computing device to at least:
    generate a challenge configured for rendering in a user interface, the challenge based at least in part on a Completely Automated Public Turing test to tell Computers and Humans Apart (CAPTCHA) scheme;

communicate the challenge to a client device for rendering to a user;
obtain an audio response to the challenge from the client device, the audio response comprising speech activity provided by the user in response to the challenge;
obtain a plurality of samples comprising face and voice samples of the user, the plurality of samples captured by the client device while the user is responding to the challenge;
perform a first verification based at least in part on determining a response time for the audio response, the response time extending from a start time of audio recording to an end time of the speech activity within the audio response, where the audio recording is started upon presentation of the challenge by the client device and comprises a response time window prior to beginning the speech activity;
in response to determining that the response time is within a threshold, perform a second verification based at least in part on extracting a face feature and a voice feature from the plurality of samples captured while the user is responding to the challenge, wherein the threshold is based at least in part on an attack reference value comprising a time period associated with an attack solving the challenge; and
grant or deny access to a resource in response to the second verification.

2. The non-transitory computer-readable medium of claim 1, wherein determining the response time is based at least in part on analyzing the audio recording of the audio response to determine a start time and the end time for the speech activity within the audio response.

3. The non-transitory computer-readable medium of claim 1, wherein the plurality of samples are captured by an input system of the client device.

4. A system, comprising:
at least one computing device; and
at least one application executed in the at least one computing device, wherein when executed the at least one application causes the at least one computing device to at least:
generate a challenge configured for rendering in a user interface, the challenge based at least in part on a Completely Automated Public Turing test to tell Computers and Humans Apart (CAPTCHA) scheme;
perform a first verification based at least in part on determining a response time for a response comprising speech activity of a user provided in response to the challenge, the response time extending from a start time of audio recording to an end time of the speech activity, where the audio recording is started upon presentation of the challenge and comprises a response time window prior to beginning the speech activity; and
in response to determining that the response time is within a threshold, perform a second verification based at least in part on extracting a face feature and a voice feature extracted from a plurality of samples comprising face and voice samples of the user captured while the user is responding to the challenge, wherein the threshold is based at least in part on an attack reference value comprising a time period associated with an attack solving the challenge.

5. The system of claim 4, wherein determining the response time is based at least in part on sending the challenge to a client device for the presentation.

6. The system of claim 4, wherein determining the response time is based at least in part on analyzing the audio recording of the response to determine a start time for the speech activity in the response.

7. The system of claim 4, wherein when executed the at least one application further causes the at least one computing device to at least determine whether the response is a correct response.

8. The system of claim 7, wherein determining whether the response is the correct response causes the at least one computing device to at least:
create an output based at least in part on transcribing at least a portion of the speech activity of the response to text; and
compare the output to a solution.

9. The system of claim 4, wherein performing the second verification further causes the at least one computing device to at least:
determine whether the face feature and the voice feature corresponds with a registered user; and
grant or deny access to a resource in response to the determination.

10. A method, comprising:
generating a challenge configured for rendering in a user interface, the challenge based at least in part on a Completely Automated Public Turing Test to tell Computers and Humans Apart (CAPTCHA) scheme;
performing a first verification based at least in part on determining a response time for a response comprising speech activity of a user provided in response to the challenge, the response time extending from a start time of audio recording to an end time of the speech activity, where the audio recording is started upon presentation of the challenge and comprises a response time window prior to beginning the speech activity; and
in response to determining that the response time is within a threshold, performing a second verification based at least in part on extracting a face feature and a voice feature extracted from a plurality of samples comprising face and voice samples of the user captured while the user is responding to the challenge, wherein the threshold is based at least in part on an attack reference value comprising a time period associated with an attack solving the challenge.

11. The method of claim 10, wherein determining the response time is based at least in part on sending the challenge to a client device for the presentation.

12. The method of claim 10, wherein determining the response time is based at least in part on analyzing the audio recording of the response to determine a start time for the speech activity in the response.

13. The method of claim 10, further comprising determining whether the response is a correct response.

14. The method of claim 13, wherein determining whether the response is the correct response comprises:
creating an output based at least in part on transcribing at least a portion of the speech activity of the response to text; and
comparing the output to a solution.

15. The method of claim 10, further comprising:
determining whether the face feature and the voice feature corresponds with a registered user; and
granting or denying access to a resource in response to the determination.

16. The non-transitory computer-readable medium of claim 1, wherein the face and voice samples of the plurality of samples are captured by the client device at a defined frequency of samples while the user is responding to the challenge, wherein the defined frequency of samples is based on a category or a difficulty associated with the CAPTCHA scheme.

17. The system of claim 4, wherein the face and voice samples of the plurality of samples are captured at a defined frequency of samples while the user is responding to the challenge, wherein the defined frequency of samples is based on a category or a difficulty associated with the CAPTCHA scheme.

* * * * *